United States Patent [19]
Thompson et al.

[11] Patent Number: 5,594,726
[45] Date of Patent: Jan. 14, 1997

[54] FREQUENCY AGILE BROADBAND COMMUNICATIONS SYSTEM

[75] Inventors: Leo J. Thompson, Lilburn; Gregory T. Dubberly, Atlanta; John A. Ritchie, Jr., Duluth, all of Ga.

[73] Assignee: Scientific-Atlanta, Inc., Atlanta, Ga.

[21] Appl. No.: 219,848

[22] Filed: Mar. 30, 1994

Related U.S. Application Data

[63] Continuation-in-part of Ser. No. 123,363, Sep. 17, 1993, Pat. No. 5,499,241.

[51] Int. Cl.$^6$ .................................................. H04J 1/00
[52] U.S. Cl. ........................ 370/485; 370/524; 455/5.1; 455/6.1; 348/12
[58] Field of Search ................................ 348/12, 11, 14, 348/15; 370/69.1, 71, 73, 110.1, 112; 375/219, 222, 202; 455/5.1, 6.10, 4.1, 6.3, 6.2, 3.1

[56] References Cited

U.S. PATENT DOCUMENTS

| | | | |
|---|---|---|---|
| 2,236,501 | 4/1941 | Goldsmith . | |
| 3,275,746 | 9/1966 | Beltrami . | |
| 3,529,088 | 9/1970 | Hauer | 370/76 |
| 3,992,589 | 11/1976 | Kuegler | 370/120 |
| 4,099,202 | 7/1978 | Cavanaugh | 358/85 |
| 4,367,548 | 1/1983 | Cotten, Jr. et al. | 358/86 |
| 4,485,400 | 11/1984 | Lemelson et al. | 358/85 |
| 4,633,462 | 12/1986 | Shitle et al. | 370/95.1 |
| 4,709,418 | 11/1987 | Fox et al. | 455/612 |
| 4,742,512 | 5/1988 | Akashi et al. | 370/104.1 |
| 4,748,618 | 5/1988 | Brown et al. | 370/94.1 |
| 4,761,684 | 8/1988 | Clark et al. | 358/84 |
| 4,763,317 | 8/1988 | Lehman et al. | 370/58.1 |
| 4,849,811 | 7/1989 | Kleinerman | 358/133 |
| 4,887,158 | 12/1989 | Guichard et al. | 358/143 |
| 4,888,638 | 12/1989 | Bohn | 358/84 |
| 4,888,795 | 12/1989 | Ando et al. | 379/53 |
| 4,891,694 | 1/1990 | Way | 358/86 |
| 4,905,080 | 2/1990 | Watanabe et al. | 358/84 |
| 4,907,079 | 3/1990 | Turner et al. | 358/84 |
| 4,912,552 | 3/1990 | Allison, III et al. | 358/84 |
| 4,926,255 | 5/1990 | Von Kohorn | 358/84 |
| 4,955,048 | 8/1990 | Iwamura et al. | 379/53 |
| 4,961,109 | 10/1990 | Tanaka | 358/84 |

(List continued on next page.)

FOREIGN PATENT DOCUMENTS

WO90/13956  11/1990  WIPO .

OTHER PUBLICATIONS

A Passive Optical/Coax Hybrid Network Architecture for Delivery of CATV, Telephony and Data Services; 1993. by M. Mesiya, pp. 358–364.

*Primary Examiner*—Benedict V. Safourek
*Assistant Examiner*—Ajit Patel
*Attorney, Agent, or Firm*—Jones & Askew

[57] ABSTRACT

A broadband communications system for coupling telephony or other digital networks to a CATV network. The system transmits a multiplex of telephony signals in the forward band of the CATV network. Each forward channel is QPR modulated on a carrier and contains multiple subscriber telephony signals. The forward telephony channels are demodulated and demultiplexed by a plurality of subscriber terminals into the individual telephony signals directed to an addressed subscriber. Audio and control signals returning from the subscriber are digitized into standard telephony signals and QPSK modulated on a carrier onto the reverse band of the CATV network. The multiplicity of reverse band telephony channels are demodulated and multiplexed into a standard telephony signal which is directly interfaced to the telephony network. The reverse band modulators are frequency agile and modulate telephony signals from a subscriber in a selected one or more frequency subbands in the reverse band of the subscription network, so as to provide selectably changeable frequencies and selectably variable bandwidth in the reverse band commensurate with a selected subscriber communication feature. e.g. a single voice line, multiple voice lines, ISDN service, data communications services, security monitoring services, etc.

113 Claims, 15 Drawing Sheets

U.S. PATENT DOCUMENTS

| | | | |
|---|---|---|---|
| 4,974,252 | 11/1990 | Osborne | 379/92 |
| 4,975,902 | 12/1990 | Damany | 370/62 |
| 4,995,071 | 2/1991 | Weber et al. | 379/53 |
| 5,003,384 | 3/1991 | Durden et al. | 358/84 |
| 5,008,926 | 4/1991 | Misholi | 379/54 |
| 5,014,125 | 5/1991 | Pocock et al. | 358/86 |
| 5,029,333 | 7/1991 | Graves et al. | 370/58.1 |
| 5,063,587 | 11/1991 | Semasa et al. | 379/53 |
| 5,075,771 | 12/1991 | Hashimoto | 358/84 |
| 5,084,903 | 1/1992 | McNamara et al. | 375/18 |
| 5,088,111 | 2/1992 | McNamara et al. | 375/18 |
| 5,124,980 | 6/1992 | Maki | 370/77 |
| 5,351,234 | 9/1994 | Beierle et al. | 370/50 |
| 5,440,335 | 8/1995 | Beveridge | 348/13 |
| 5,469,495 | 11/1995 | Beveridge | 379/56 |

Multiframe definition
```
subframe 0   C1  0   0   1   1   0   1   1    16 data bytes
subframe 1       0   1   DL  DL  AL  A   B  C  16 data bytes
subframe 2   C2  0   0   1   1   0   1   1    16 data bytes
subframe 3       0   1   DL  DL  AL  A   B  C  16 data bytes
subframe 4   C3  0   0   1   1   0   1   1    16 data bytes
subframe 5       1   1   DL  DL  AL  A   B  C  16 data bytes
subframe 6   C4  0   0   1   1   0   1   1    16 data bytes
subframe 7       0   1   DL  DL  AL  A   B  C  16 data bytes
```
|---------------- total of 17 bytes per subframe ----------------|
2 ms subframe period
68 kb/s data rate
FIG. 9A
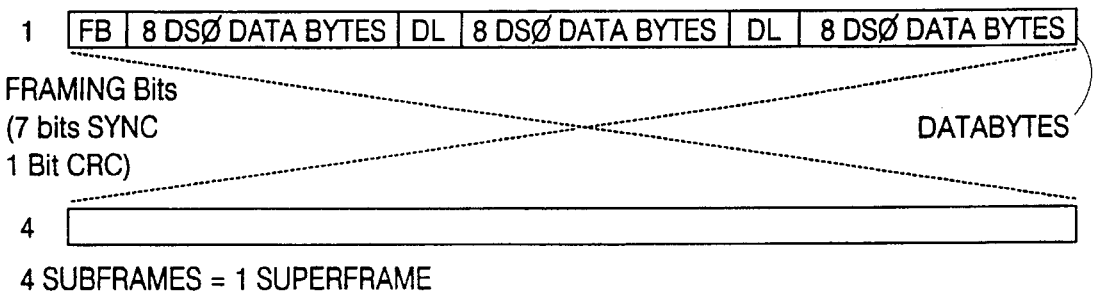
FIG. 9B
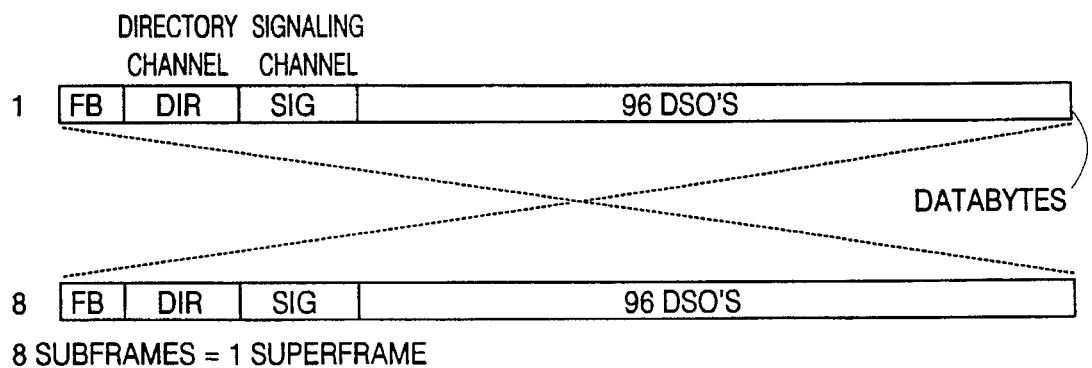
FIG. 9C

| 128 kHz CHANNEL (CARRIER CENTER FREQUENCY) | SUBSCRIBER IDENTIFICATION (SID) | SERVICE LEVEL | TELCO DS0# | SIGNALLING STATUS | ERROR COUNT | THRESHOLD | NOISY CHANNEL FLAG 0=a 1=NOISY |
|---|---|---|---|---|---|---|---|
| UP1 (5.120 MHz) | S1 | DEFAULT (1 LINE) | DS0-6 | ON HOOK | N/A | 256 | 0 |
| | | UNUSED | | | | | |
| UP2 (5.248 MHz) | S2 | 1 LINE | DS0-7 | OFF HOOK | 6 | 256 | 0 |
| | S2 | 1 LINE | DS0-204 | ON HOOK | N/A | 256 | |
| UP3 (5.376 MHz) | S3 | ISDN (1B) | DS0-12 | RING | 12 | 256 | 0 |
| | S3 | ISDN (1B) | DS0-13 | | 35 | 256 | 0 |
| UP4 (5.504 MHz) | S3 | ISDN (D) | DS0-144 | (1/4 DS0) | 20 | 256 | |
| | | UNUSED | | | | | |
| ⋮ | | | | | | | |
| UP20 (7.552 MHz) | S4 | T1 | DS0-155 | OFF HOOK | 260 | 256 | 1 |
| ⋮ | | (24 DS0'S) | ⋮ | | | | |
| UP32 (9.088 MHz) | | | | | | | |
| | S4 | T1 | DS0-179 | RING | 15 | 256 | |
| ⋮ | | UNUSED | | | | | |
| UP130 (21.632 MHz) | S5 | SECURITY MONITOR | N/A | NORMAL | | | |
| | S6 | SECURITY MONITOR | DS0-191 | ALARM | | | |
| ⋮ | | | | | | | |
| UP194 (29.824 MHz) | | SIGNALLING | N/A | | | | |

(EACH 128 kHz CHANNEL CARRIES TWO 64 kbps DS0'S, ONE 16 kbps DIGITAL OVERHEAD CHANNEL, QPSK MODULATED, IN ONE 108 kHz BAND WITH 20 kHz GUARD BAND)

FIG. 15

FREQUENCY AGILE BROADBAND COMMUNICATIONS SYSTEM

CROSS REFERENCE TO RELATED APPLICATION

This application is a continuation-in-part of application Ser. No. 08/123,363, filed Sep. 17, 1993, now U.S. Pat. No. 5,499,241, entitled "Broadband Communications System".

FIELD OF THE INVENTION

The system pertains generally to broadband communications systems, such as cable or community antenna television (CATV) networks, and is more particularly directed to communicating telephony signals, and other or similar signals, over CATV and equivalent networks.

BACKGROUND OF THE INVENTION

In order to introduce the present invention and the problems that it solves, it is useful to overview a conventional CATV broadband communication system, and then examine certain prior approaches to problems encountered when attempting to introduce telephony signals into the broadband environment.

Conventional Cable Television Systems (CATV)

Cable television systems, sometimes referred to as community-antenna television (CATV) systems, are broadband communications networks of coaxial cable and optical fiber that distribute television, audio, and data signals to subscriber homes or businesses. In a typical CATV system, a single advantageously located antenna array feeding a cable network supplies each individual subscriber with a usable television signal.

Since the pioneer days, cable networks have experienced enormous growth and expansion in the United States, particularly in urban networks. It is estimated that CATV networks currently pass approximately 90% of the population in the United States, with approximately 60–65% of all households actually being connected. While cable systems originally had very simple architectures and provided a limited number of different television signals, the increase in the number of television broadcasters and television owners over the last several decades has resulted in much more complex and costly modern cable distribution systems.

A typical CATV system comprises four main elements: a headend, a trunk system, a distribution system, and subscriber drops.

The "headend" is a signal reception and processing center that collects, organizes and distributes signals. The headend receives satellite-delivered video and audio programming, over-the-air broadcast TV station signals, and network feeds delivered by terrestrial microwave and other communication systems. In addition, headends may inject local broadcasting into the package of signals sent to subscribers such as commercials and live programming created in a studio.

The headend contains signal-processing equipment that controls the output level of the signals, regulates the signal-to-noise ratio, and suppresses undesired out-of-band signals. Typical signal-processing equipment includes a heterodyne processor or a demodulator-modulator pair. The headend then modulates received signals onto separate radio frequency (RF) carriers and combines them for transmission over the cable system.

The "trunk system" is the main artery of the CATV network that carries the signals from the headend to a number of distribution points in the community. A modern trunk system typically comprises of a combination of coaxial cable and optical fibers with trunk amplifiers periodically spaced to compensate for attenuation of the signals along the line. Such modern trunk systems utilizing fiber optics and coaxial cable are often referred to as "fiber/coax" systems.

The "distribution systems" utilize a combination of optical fibers and coaxial cable to deliver signals from the trunk system into individual neighborhoods for distribution to subscribers. In order to compensate for various losses and distortions inherent in the transmission of signals along the cable network, line-extender amplifiers are placed at certain intervals along the length of the cable. Each amplifier is given just enough gain to overcome the attenuation loss of the section of the cable that precedes it. A distribution network is also called the "feeder".

There is a strong desire in the CATV and telecommunications industry to push optical fiber as deeply as possible into communities, since optical fiber communications can carry more signals than conventional networks. Due to technological and economic limitations, it has not yet proved feasible to provide fiber to the subscriber's home. Present day "fiber deep" CATV distribution systems including optical fibers and coaxial cable are often called "fiber-To-the-Serving-Area" or "FFSA" systems.

"Subscriber drops" are taps in the distribution system that feed individual 75 Ω coaxial cable lines into subscribers' television sets or subscriber terminals, often referred to as "subscriber premises equipment" or "customer premises equipment" ("CPE"). Since the tap is the final service point immediately prior to the subscriber premises, channel authorization circuitry is often placed in the tap to control access to scrambled or premium programming.

Cable distribution systems were originally designed to distribute television and radio signals in the "downstream" direction only (i.e., from a central headend location to multiple subscriber locations, also referred to as the "forward" path). Therefore, the component equipment of many older cable systems, which includes amplifiers and compensation networks, is typically adapted to deliver signals in the forward direction only. For downstream transmissions, typical CATV systems provide a series of video channels, each 6 MHz in bandwidth, which are frequency division multiplexed across the forward band, in the 50 MHz to 550 MHz region of the frequency spectrum. As fiber is moved more deeply into the serving areas in fiber/coax and FTSA configurations, the bandwidth of the coax portion is expected to increase to over 1 GHz.

The advent of pay-per-view services and other interactive television applications has fueled the development of bidirectional or "two-way" cable systems that also provide for the transmission of signals from the subscriber locations back to the headend. This is often referred to as the "upstream" direction or the "reverse" path. This technology has allowed cable operators to provide many new interactive subscriber services on the network, such as impulse-pay-per-view (IPPV). In many CATV systems, the band of signals from 5 MHz to 30 MHz is used for reverse path signals.

However, the topology of a typical CATV system, which looks like a "tree and branch" with the headend at the base and branching outwardly to the subscriber's, creates technical difficulties in transmitting signals in the upstream direction back to the headend. In the traditional tree and branch cable network, a common set of downstream signals are distributed to every subscriber home in the network. Upstream signals flowing from a single subscriber toward the headend pass by all the other upstream subscriber homes on the segment of distribution cable that serves the neighborhood.

The standard tree and branch topology has not proven to be well suited for sending signals from each subscriber location back to the headend, as is required for bidirectional communication services. Tree and branch cable distribution systems are the most efficient in terms of cable and distribution usage when signals have to be distributed in only the downstream direction. A cable distribution system is generally a very noisy environment, especially in the reverse path. Interfering signals may originate from a number of common sources, such as airplanes passing overhead or from Citizens Band (CB) radios that operate at a common frequency of 27 MHz, which is within the typical reverse channel bandwidth of CATV networks. Since the reverse direction of a tree and branch configuration appears as an inverted tree, noise is propagated from multiple distribution points to a single point, the headend. Therefore, all of the individual noise contributions collectively add together to produce a very noisy environment and a communications problem at the headend.

Present day FTSA systems facilitate the communication of signals in the reverse direction by dividing the subscriber base of a cable network into manageable serving areas of approximately 400–2500 subscribers. This allows for the reuse of limited reverse band frequency ranges for smaller groups of subscribers. The headend serves as the central hub of a star configuration to which each serving area is coupled by an optical communications path ending in a fiber node. The fiber node is connected to the serving area subscribers over a coaxial cable distribution sub-network of feeders and drops in each serving area. In the FTSA configuration, some of the signals in the forward direction (e.g., television program signals) are identical for each serving area so that the same subscriber service is provided to all subscribers. In the reverse direction, the configuration provides an independent spectrum of frequencies confined to the particular serving area. The FTSA architecture thus provides the advantage of multiplying the bandwidth of the reverse portions of the frequency spectrum times the number of serving areas.

The Desire for Telephony Service

The ever-expanding deployment of fiber optic technology in CATV systems across the country has cable operators looking to provide a whole new range of interactive services on the cable network. One area that is of particular interest is telephony service. Because of recent advances in technology as well as the loosening of regulations, the once distinct lines between the cable television network and the telephone network have blurred considerably. Currently there is a great demand for a broadband communication system that can efficiently provide telephone service over the existing cable distribution network.

Moreover, there is substantial interest expressed by telephone system operating companies in the idea of increased bandwidth for provision of new services to telephone subscribers, such as television; interactive computing, shopping, and entertainment; videoconferencing, etc. Present day "copper" based telephony service (so called because of the use of copper wires for telephone lines) is very bandwidth limited—about 3 kHz—and cannot provide for such enhanced services by the telephone companies without massive changes to the telephone networks infrastructure.

Existing communications systems, however, have not proven to be well suited for the transmission of telephony signals on the cable network. A system for transmitting telephony signals must be configured to allow single point to single point distribution (i.e., from a single subscriber to a single subscriber). However, unlike the telephone companies with their well-established national two-way networks, the cable industry is fragmented into thousands of individual systems that are generally incapable of communicating with one another. The cable network is instead ideally configured for single point to multiple point signal transmission (i.e., from a single headend downstream to multiple subscriber locations).

Moreover, CATV systems do not have the switching capabilities necessary to provide point to point communications. A communications system for the transmission of telephone signals must therefore be compatible with the public switched telephone networks ("PSTN") operated by the telephone operating companies. To be useful in the carriage of telephony signals, a CATV network must be able to seamlessly interface to a telephony network at a point where it is commercially viable to carry telephony signals. It must also provide signals that can pass to other parts of the interconnected telephone systems without extensive modulation or protocol changes to thereby become part of the international telephone system.

Telephony on Data Communications Network

One approach taken to provide a bidirectional broadband communications system is shown in U.S. Pat. No. 5,084,903 of McNamara et al., assigned to First Pacific Networks (hereinafter referred to as "FPN"). This patent describes an approach to the communication of telephony signals that appears primarily designed to operate in an office-type data communications network environment (e.g., Ethernet). Data communications networks are typically bandwidth symmetrical, that is, the forward and reverse signal paths consume equal amounts of bandwidth, and the topology is star or serial, not tree and branch. In contrast, CATV networks are bandwidth asymmetrical, with heavy allocation of bandwidth for use in the downstream direction and limited upstream bandwidth. As the present inventors have discovered, the noise problem in the upstream direction is difficult in a broadband bandwidth-asymmetrical, tree and branch topology, as contrasted with a symmetrical office-type data communications network.

The system described in the FPN patent employs two different modulation schemes for communicating information between a central headend and a plurality of subscriber nodes. For downstream communications, the FPN system transmits signals continuously in a plurality of 6 MHz bandwidth channels. In a preferred embodiment, an AM-PSK modulator is used in the downstream path. For upstream communications, the FPN system transmits packets of information in bursts to a headend using an offset quadrature phase shift keyed (OQPSK) modulator.

While the FPN communications system may be suitable for communicating telephony signals on a data communications network such as Ethernet, it does not solve certain problems that occur in the carriage of telephony signals on a broadband cable network. Due to the single point to multiple point configuration (tree and branch) of the CATV network, upstream transmissions of telephony signals have to contend with multiple noise sources as the branch signals from each subscriber are merged together toward the headend. It is believed, however, that the burst mode approach used in the reverse path of the FPN system is particularly susceptible to these noise issues. Specifically, it is believed that the framing bits and sequencing of the data streams are susceptible to interruption when an interference signal is sustained for any significant length of time (i.e., for longer than the length of a data frame) anywhere within one of the 6 MHz bandwidth channels used to carry telephony signals.

It is further believed that the interruption of the framing bits may result in the loss of content in all telephone conversations represented within the data frame interrupted. In a data communications environment, this signal interruption may only be noticeable as a slowdown on the network, and, though inconvenient, may be considered acceptable. However, such degradation of signal quality in a cable and telephony environment is undesirable and may be unacceptable.

There is no discussion in the FPN patent of any means for insertion or removal of telephony signals from and to the public switched telephone network (PSTN). The FPN system appears to provide only a local area telephone network designed primarily for inter-office communications (such as office to office intercom), as only limited access to the PSTN is suggested. There are a number of different locations in the FPN equipment where telephony signal insertion and removal could occur, but the patent does not describe any means for signal insertion or removal, or discuss any of the issues associated with signal insertion and removal. At best, it appears that telephony signals would be inserted and removed at nodes directly connected to the broadband media (e.g., the coaxial cable), as suggested at col. 3, line 30. The patent does not indicate how such insertion and removal directly from the broadband medium should best be effected, and is silent on issues involving multiple telephony channels.

Therefore, there is a need for a broadband communications system that is compatible with the existing public switched telephone networks and that is not sensitive to noise or other interference issues, particularly in the reverse path. There is also a need for a broadband communications system that is bandwidth efficient and provides a higher spectral efficiency than present systems, thereby increasing the number of subscribers that may be served by each broadband network with telephony and enhanced services offered by CATV system operators, telephone company operating companies, and others.

SUMMARY OF THE INVENTION

The invention includes methods and apparatus for providing broadband communications, including bidirectional telephony communications, over a cable distribution network. In particular, the present invention provides an integrated CATV/telephony system that is compatible with today's public switched telephone networks and can also deliver video, data, security monitoring, and other services without affecting current in-home wiring or equipment.

In one embodiment, the method includes communicating telephony signals from a telephony network to the CATV subscribers in the forward band of the cable network and communicating telephony signals from the CATV subscribers to the telephony network in the reverse band of the cable network.

In another preferred embodiment, the method includes the digitizing of individual subscriber telephony signals into a multiplexed signal that is carried on a frequency division multiplexed (FDM) carrier in the forward band of the cable network. The digital multiplexed signal is quadrature partial response (QPR) modulated on a carrier which is positioned in an otherwise unused portion of the CATV network forward band. In the illustrated embodiment, the QPR signal is preferably approximately 3 MHz in bandwidth and easily fits in a standard 6 MHz video channel. In another preferred embodiment, a pair of the QPR signals can be placed in an otherwise unused channel in the cable line to utilize approximately 6 MHz of bandwidth. By making a system which uses a robust digital signal, the bandwidth of the forward CATV band can be efficiently allocated. The system operator can plan and change these allocations on a flexible basis as new services are made available or old services are taken off line.

In a preferred embodiment, the subscriber telephony signals to the telephony network are digitized and individually modulated on a carrier in the reverse band of the CATV system. As an illustrated example, a subscriber DS0 telephony line is QPSK modulated into a 50 kHz bandwidth signal and frequency division multiplexed on the reverse band of the CATV network. The individual telephony signals are multiplexed into a standard time-division multiplexed (TDM) telephony signal which can be adapted to couple directly into a SONET port or other standard telephony connection, such as a DS1, DS2, or DS3 format signal, of the telephony network.

By using the reverse band of the CATV network in small increments of 50 kHz, the flexibility of the reverse signaling band is not compromised. The system operator can still provide interactive TV services, IPPV services, and other reverse path signals while providing telephony service.

The number of subscribers served by the telephony service can be increased several fold if the CATV network is a FTSA network. The space (frequency) division multiplexing (FDM) used in the reverse band makes it economical to provide a substantial number subscribers in a serving area with a telephony service. If a serving area contains 500 subscribers, then the bandwidth needed for a dual path system at 50 kHz per subscriber would be 25 MHz, within the 5–30 MHz reverse band of the most prevalent split band systems.

According to another aspect of the invention, the reverse band circuitry is frequency agile, and is responsive to channel information provided in a directory channel in the forward band from the headend interface unit for tuning to one or more selected reverse band frequencies, for modulating the telephony signals from the customer interface unit in the one or more selected frequency subbands. The frequency agile feature permits the selective allocation of bandwidth to satisfy subscriber demands and change reverse band channels in response to noise in a channel. The frequency agility permits the invention to carry out dynamic bandwidth allocation to effect varying levels of service for subscribers, e.g. single voice line, multiple voice line, ISDN, data communications, etc., and avoid particular reverse band channels that are susceptible to and/or are experiencing noise.

According to another aspect of the invention, the system is operative to determine an appropriate service level to provide communications to a particular subscriber, and allocate one or more selected frequency subbands in the reverse band of the subscription network so as to provide selectably variable bandwidth commensurate with the determined appropriate service level. The identity of the one or more selected frequency subbands are communicated to the particular subscriber in a directory channel in a forward band. Incoming telephony signals are communicated to the particular subscriber in the forward band of frequencies, as in other embodiments of the invention. At the subscriber terminal associated with the particular subscriber, the identity of the one or more selected frequency subbands for communications back to the headend is received via monitoring the directory channel. Subscriber telephony signals are then communicated to the headend in the one or more selected frequency reverse frequency subbands.

In the alternative frequency agile embodiment, a pair of subscriber DS0 telephony lines are QPSK modulated into a 108 kHz bandwidth signal, with 20 kHz guard band, and frequency division multiplexed on the reverse band of the CATV network. In this embodiment, there is capacity for handling 388 DS0 equivalent telephony channels in the 5 MHz to 30 MHz reverse band. To serve 388 subscribers with a single DS0 telephony service, then the bandwidth needed for a dual path system is as follows: 194 downstream channels, each channel carrying 2 DS0's, each channel at 128 kHz, yielding about 25 MHz, positioned within the 5–30 MHz reverse band of the most prevalent split band systems.

Access to the broadband communications system is provided by a residential interface unit, also called a "customer interface unit" (CIU), installed outside the subscriber's premises. The broadband telephone signals are terminated at the end of the CATV drop cable and pass through the home as a standard two-wire telephone signal. The subscriber's interior telephony network can disconnected from the telephone company copper network and connected or jumpered directly to the CIU.

The particular modulation technique utilized in the downstream path results in increased spectral efficiency of the communications system over traditional approaches. For the preferred embodiment utilizing 194 dual-DS0 upstream channels at 128 kHz per channel, the spectral efficiency is as follows:

efficiency=(388 $DS0$'s×64 kbps/$DS0$)/25 MHz=1 bit per Hz

As described, one of the primary advantages of the present invention is its frequency agility, and the ability to allocate bandwidth to subscribers on demand. The frequency agile feature is preferably provided in the reverse band of the communications system, and is operative for modulating a telephony signal from a subscriber in one or more frequency subbands in the reverse band of the subscription network so as to provide selectably variable bandwidth in the second band commensurate with selected subscriber communication features. For example, a subscriber can subscribe to a single voice grade line telephone service, plural voice grade telephone line service, ISDN telephone service, local or wide area network communication services (e.g. ETHERNET, Appletalk), security monitoring communication services, or the like.

The present invention therefore differs from conventional systems by providing dynamic frequency assignment, in which each subscriber is allocated bandwidth on demand. This approach provides the ability to change the frequency if an interfering carrier is introduced during the course of a conversation.

According to yet another aspect of the invention, the preferred system provides each subscriber premises with a unique address that is permanently configured in the CIU such as a FLASH ROM or PROM. This allows the headend of the cable system to communicate with each CIU individually. When a subscriber communicates with the headend to request telephony service, the headend can verify the levels of subscriber service or features that are authorized for the requesting subscriber, and appropriate bandwidth (e.g. DS0 channels) can be allocated commensurate with the authorized and requested level of service or feature.

According to yet another aspect of the invention, the preferred system also provides for the ability to monitor or verify signal performance at any time.

The alternative embodiment carries out steps of monitoring the noise level in the 128 kHz subbands provided in the reverse spectrum, and changing the frequency of a selected subband allocated for provision of service to a selected subscriber in response to a determination that the noise level in the monitored subband exceeds a predetermined threshold. This permits dynamic reallocation of telephony signal from a particular region in the reverse channel spectrum that may be subject to noise or interference, so as to move the reverse band communication to a region of the spectrum that is cleaner.

While each standard DS0 telephony voice channel typically has a 64 kbps requirement, the present system provides two 64 kbps DS0 voice channels and one 16 kbps digital overhead channel, for a total of 144 kbps of actual data per 128 kHz channel. The overhead channel carries information including the identity of the caller, the calling party's phone number, the called party's phone number, the switch position, and the line position. The overhead information may also contain data capability. For example, a bit error test in a loop back condition may be sent in the extra bits during the conversation to evaluate the signal quality. If the signal quality falls below some predetermined threshold (to be determined by the user or the system), the system will change the upstream or downstream carrier.

A system constructed in accordance with the present invention provides the further advantage of compatibility with a growing market. As cable operators begin to provide telephony service over the cable network, it may be desirable not to have to initially allocate the entire reverse bandwidth for upstream telephony signals. Likewise, as telephony applications increase, it may be desirable to allocate more bandwidth to telephony applications than nominal 25 MHz provided in the disclosed embodiment. Ideally, the cable operators would like to deploy hardware and modify architectures as the consumer demand dictates. Furthermore, there may be instances where a subscriber may have an application that has a higher bandwidth requirement (e.g., video teleconferencing at 384 kbps). Systems that assign a predetermined, unchangeable segment of bandwidth to each subscriber, however, do not have the flexibility to expand or selectably allocate bandwidth in response to demand. Instead, each subscriber must be provided with hardware established at a certain frequency. The present invention, instead of assigning each subscriber a dedicated frequency, allocates as many channels as needed in response to demands for a particular level of service. Thus, the present system can provide subscribers with services such as video teleconferencing, fax lines, multiple voice lines, ISDN, etc. as needed.

These and other objects, features and advantages of the invention will be better understood and more fully appreciated if a reading of the following detailed description is undertaken in conjunction with the appended drawings and claims.

BRIEF DESCRIPTION OF THE DRAWINGS

FIG. 9A is a pictorial representation of the framing protocol of the modulator illustrated in FIG. 8.

FIG. 9B is a pictorial representation of the framing protocol or data format of the reverse path signals utilized in an alternative embodiment of the present invention.

FIG. 9C is a pictorial representation of the framing protocol or data format of the forward path signals utilized in an alternative embodiment of the present invention.

FIG. 15 illustrates a service level table maintained by the headend unit (HIU) of FIG. 11 to allocate varying service levels requested by subscribers with various reverse channel frequencies.

DETAILED DESCRIPTION OF THE PREFERRED EMBODIMENTS

Figure 1:
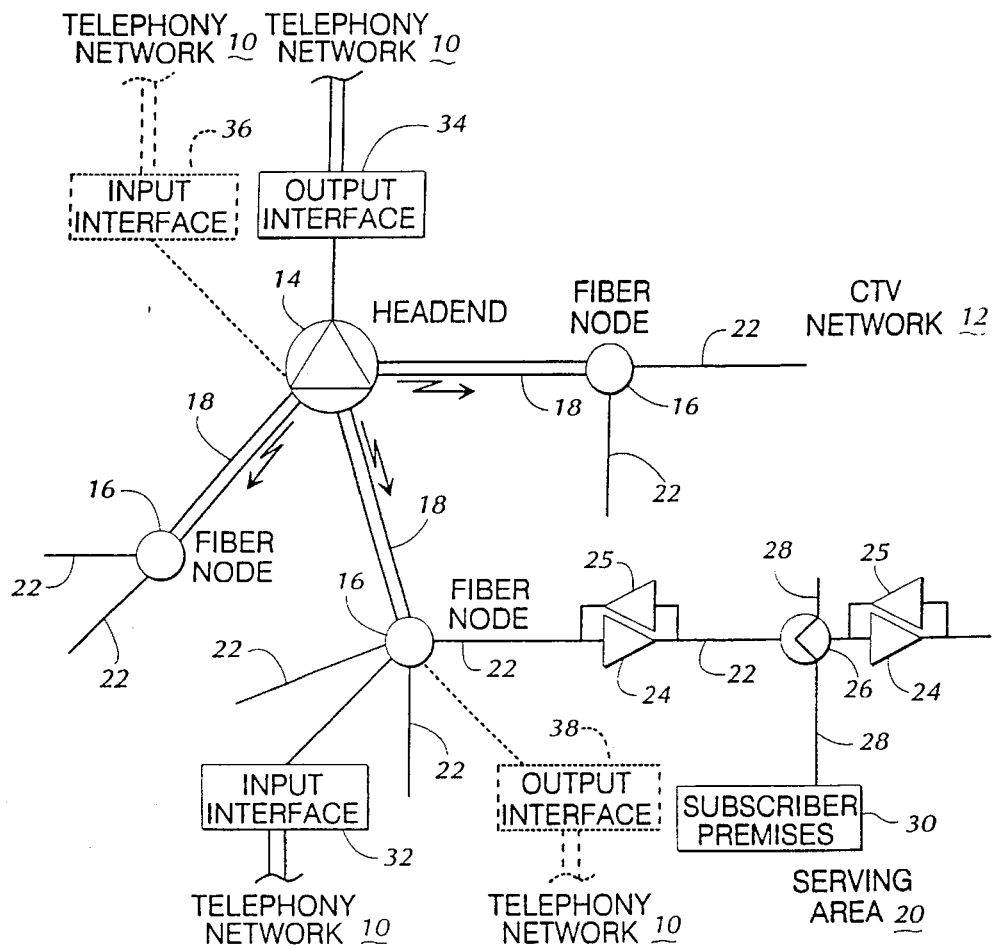
FIG. 1 is a system block diagram of a broadband telephony system constructed in accordance with the invention.

With respect now to FIG. 1, there is shown a broadband communications system constructed in accordance with the invention. The system will be described in connection with the communications of telephony signals, but it will be evident that other signals of similar or equivalent types can also be used. Further, while digital telephony signals are described, the system is also capable of communicating analog telephony signals or other types of digital signals. Telephony signals from the telephony network are coupled to the CATV network 12 and are communicated over the CATV network to an addressed subscriber premises 30. The addressed subscriber 30 communicates telephony signals back over the CATV network 12 which are then coupled to the telephony network 10. The system serves as an extension of the telephony network 10 where subscribers can call out to the telephony network 10 or receive calls from the telephony network. This service is in addition to the conventional video, audio, data and other services provided to each subscriber by the CATV network 12.

By "headend", we do not mean to be limited to a conventional coaxial CATV headend such as 14, but also consider that an optical fiber node such as 16 or other communication node that can serve the functions of receiving multiplexed communication signals from a source of signals, such as a telephony central office, and communicating such signals to subscribers in the broadband network. As will be seen in the following discussion, a CATV headend 16 is the preferred embodiment for effecting these functions.

A preferred implementation of the broadband communications system is illustrated in FIG. 1. The system includes the telephony network 10 which interfaces through an input interface 32 to the CATV network 12. The CATV network 12 further interfaces with the telephony network 10 through an output interface 34. Telephony signals are communicated to subscribers of the CATV network 12 through the input interface 32 to a subscriber premises 30. Telephony signals from the subscriber premises 30 of the CATV network 12 are communicated over the CATV network 12 and through the output interface 34 to the telephony network 10. The broadband communications system does no switching and thus takes advantage of the strength of the CATV network 12 for its broadband communications path and the strength of the telephony network 10 for its connection and switching capability.

The CATV network 12 is illustrated as having a fiber to the serving area (FTSA) architecture. A headend 14 provides CATV programming which is distributed via a distribution network to a plurality of subscribers at their subscriber premises 30. The distribution network serves a plurality of "serving areas", such as the one referenced at 20, which are groups of subscribers that are located proximate to one another. Each serving area is comprised of groups ranging in size from about 50 homes to about 2500 homes. The headend 14 is coupled to each serving area in a star configuration through an optical fiber 18 which ends in a fiber node 16. The CATV programming and telephony signals are converted from an RF broadband signal to light modulation at the headend 14, transmitted over the optical fiber 18, and then converted back to an RF broadband signal at the fiber node 16. Radiating from each of the fiber nodes 16 throughout its serving area 20 is a coaxial sub-network of feeders 22 having bidirectional amplifiers 24 and bidirectional line extenders 25 for boosting the signal.

The RF broadband signal is distributed to each of the subscriber premises 30 by tapping a portion of the signal from the nearest feeder 22 with a tap 26, which is then connected to the subscriber premises through a standard coaxial cable drop 28. The CATV network thus provides a broadband communications path from the headend 14 to each of the subscriber premises 30, which can number in the several hundreds of thousands.

While one preferred embodiment of the invention shows the input interface 32 coupled to the fiber node 16 and the output interface 34 coupled to the headend 14, it is evident that the insertion and extraction of the RF telephony signals need not be limited to this single architecture. Both the input interface 32 and an output interface 38 (shown in phantom) can be connected at the fiber node 16. Alternatively, both an input interface 36 (shown in phantom) and the output interface 34 can be coupled to the headend 14. Moreover, the input interface 36 can be coupled to the headend 14, while the output interface 38 can be coupled to the fiber node 16. For cable architectures which do not conform to a star configuration, it is generally most advantageous to insert the RF telephony signals at the headend and to extract them from the system at the headend. Each architecture has its own distinct advantages as will be more fully described hereinafter.

The input and output interfaces 32 and 34 produce a facile method for inserting the telephony signals in one direction and extracting the telephony signals in the other. The telephony signals are transformed into compatible RF signals which can be inserted or extracted from the CATV network 12 in much the same manner as other programming at various points in the network. The compatibility of RF telephony signals with the previous RF signals on the CATV network 12 allows their transmission in a transparent manner over the network without interference to the other signals or special provision for their carriage.

Theoretically, the broadband communications path provided by the CATV network 12 is bidirectional so that information can be passed in each direction. However, because of convention and the single point to multipoint nature of most networks, the reverse path, i.e., communications originating from the subscriber premises 30 and communicated to the headend 14, is much more limited. Normally, the reverse amplifiers 25 are bandwidth limited and include diplexers which separate the CATV spectrum into forward and reverse paths based on frequency.

Figure 2:
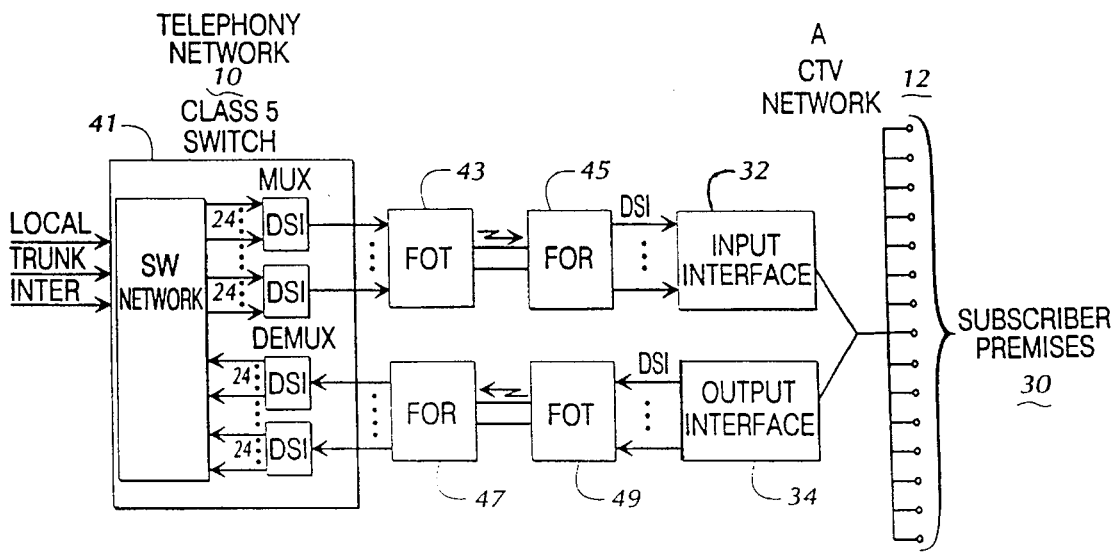
FIG. 2 is a system block diagram of one embodiment of the broadband communications system illustrated in FIG. 1 connected to a telephony network.

FIG. 2 illustrates a preferred implementation of the broadband communication system configured as an extension to a telephony network. For connection to the telephony network 10, a class 5 switch 41 is used. The switch 41 has suitable circuitry for handling conventional local, trunk and interconnect signals which integrate the switch into the local area, national and international calling grids. The switch 41 has a switching network of crosspoints which may switch any of a plurality of inputs to any plurality of outputs. Particularly, the switch 41 has equipment to provide DS1 format interfaces.

As known to those skilled in the art, a "DS0" signal is a standard telephony format corresponding to a 64 kb/s digital channel which can be used for voice, data, audio, etc. Thus a single DS0 telephony signal can be viewed as a single telephone conversation. Likewise, a "DS1" signal corresponds to a 1.544 Mb/s digital channel that contains 24 DS0 channels. For a summary of the bit rates of the standard digital telephony formats and their relationships to one another, see TABLE 1 below:

TABLE 1

| Digital Signal | Bit Rate | DS0 | DS1 | DS3 |
| --- | --- | --- | --- | --- |
| DS0 | 64 kb/s | 1 | 1/24 | 1/672 |
| DS1 (also T-1) | 1.544 Mb/s | 24 | 1 | 1/28 |
| DS1C | 3.152 Mb/s | 48 | 2 | 1/14 |

TABLE 1-continued

| Digital Signal | Bit Rate | DS0 | DS1 | DS3 |
| --- | --- | --- | --- | --- |
| DS2 | 6.312 Mb/s | 96 | 4 | 1/7 |
| DS3 | 44.736 Mb/s | 672 | 28 | 1 |
| OC-1 | 51.84 Mb/s | 672 | 28 | 1 |

Additionally, the switch 41 has means for demultiplexing DS1 signals into a plurality of DS0 signals which then can be routed to outgoing points. The system uses a forward path which receives a plurality of the DS1 channels at the input interface 32 and connects them over the CATV network 12 to the subscriber premises 30. The subscriber premises 30 transmits telephony signals over the CATV network 12 to the output interface 34 which converts them back into the same number of DS1 signal channels for transmission to the switch 41. If the switch 41 is located proximately to the input interface 32 and the output interface 34, then they can be coupled directly. Alternatively, as will be the most prevalent case, where a headend or fiber node is not located proximately to the class 5 switch, an optical fiber link can be used to connect the switch 41 and interfaces 32 and 34.

In the forward direction, a fiber optic transmitter 43 converts the plurality of DS1 telephony signals into an optical signal which is transmitted to a fiber optic receiver 45. The fiber optic receiver 45 converts the optical signal back into the DS1 format telephony signals. Likewise, the fiber optic transmitter 49 in the reverse path converts the outgoing DS1 telephony signals into an optical signal which is received by the fiber optic receiver 47 for conversion back into the DS1 telephony format signals.

The DS1 telephony signal format was chosen because it is a standard telephony format, and conventional optical links to do the conversion and transmission are readily available for the transmitters 43, 49 and for the optical receivers 45, 47.

The system uses this bidirectional mode of communication where each DS1 signal contains 24 DS0 channels, which can be considered groups of 64 kb/s digital data channels. The 64 kb/s channels can either be used for voice, data, audio (music, stored information), etc. In general, for telephony type signals, each DS0 channel derived from a connected DS1 link is addressed to and associated with a particular subscriber. The preferred embodiment provides transport from each DS0 signal in the connected DS1 link to the particular subscriber, by transmitting incoming telephony signals downstream in a selected DS0 downstream channel in the broadband system forward path, and has a corresponding DS0 upstream channel assigned to that subscriber in the broadband system reverse path for outgoing telephony signals. Received DS0 signals from subscribers are then routed to the corresponding DS0 time slot in the DS1 link for outgoing signals. This permits the switch 41 to connect any of the local, trunk or interconnect calling points to any of the DS0 channels in the forward path and its associated DS0 channel in the reverse path to the same local, trunk or interconnect points for completing the communications path. Each of the subscribers 30 appears as another DS0 subscriber connected directly to the class 5 switch 41. The distribution system of the CATV network 12 is transparent to the switch 41 and does not need any further communication, information or connection to the broadband communication system.

Figure 3A:
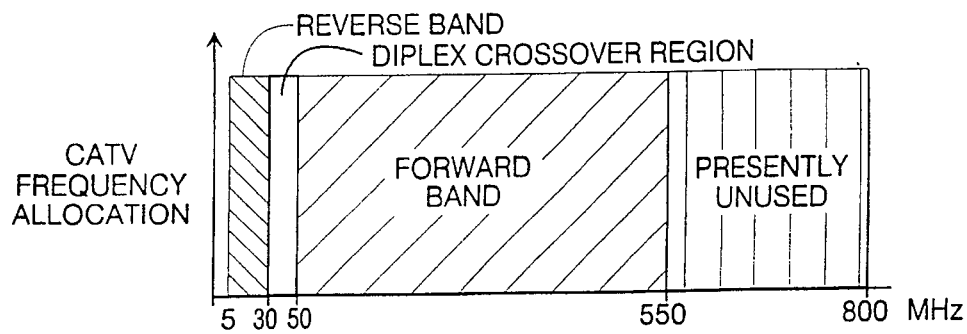
FIG. 3A is a pictorial representation of the frequency allocation of typical split CATV systems illustrating their forward and reverse signaling bands.

FIG. 3A illustrates a typical frequency allocation for many of the installed split band CATV networks. The frequencies used for programming which generate the revenues for the system operator are carried in the forward band from 50 MHz to about 550 MHz. Although, the frequencies above 550 MHz are not presently used, there has been increased interest in providing additional services in this unused forward bandwidth, currently considered to extend to about 1 GHz. Conventionally, the forward band comprises a series of video channels, each 6 MHz in bandwidth, which are frequency division multiplexed across the forward band. Several areas are not used and each video channel has a 1.5 MHz guard band between other adjacent channels.

In combination with the forward band, the typical CATV spectrum includes a reverse band from about 5–30 MHz. These frequencies have been allocated for signals returning from the subscriber to the headend. This band has traditionally been relatively narrow because of the high noise from the funneling effects of the multiplicity of the multipoint signals adding to a single point. Further, in the past bandwidth taken from the forward band has meant less revenues from other services. The present invention provides a solution to these problems by providing a system where the telephony signals to a subscriber premises are communicated in the forward band of the spectrum and the telephony signals from a subscriber premises are communicated in the reverse band of the CATV system.

Figure 3B:
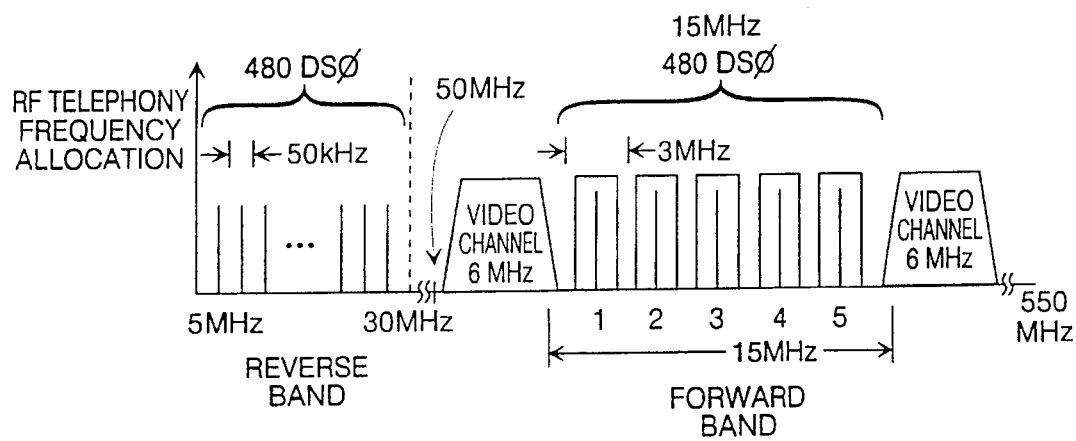
FIG. 3B is a pictorial representation of the frequency allocation of the broadband communications system illustrated in FIG. 2.

As seen in FIG. 3B, the broadband communications system utilizes a plurality of frequency division multiplexed carriers in the forward band to communicate the telephony signals to the subscribers. In the illustrated embodiment, five channels of approximately 3 MHz are used to carry incoming telephony signals from the telephony network 10. Each forward channel is a QPR modulated carrier, where the modulation occurs as a 6.312 Mb/s digital data stream, specifically in a DS2 telephony signal format including four DS1 telephony signals. The carriage capacity of such a system is then 20 DS1 channels, or enough for 480 DS0 voice channels.

Each of the reverse band signals are 50 kHz in bandwidth, which is narrow enough to be easily placed at different frequency division multiplexed positions in the frequency spectrum. The modulators are frequency agile and can reallocate frequencies based upon traffic over the system, noise, channel condition, and time of use. The 50 kHz wide carriers can be placed anywhere in the reverse band that there is space for them. Depending upon the CATV system, i.e., whether there is a reverse amplification path in the distribution network, they could also be allocated to frequencies normally reserved for forward band transmissions. Further, such system is expandable by bandwidth for other uses besides the individual telephony signals. For example, if a particular subscriber required a return path of a greater bandwidth than the 50 kHz, then the bandwidth could be easily allocated to this use without a complete reconfiguration of the system. Such uses may include high speed data transmissions, trunk connections for small central offices, video services originating from the telephony network, and other uses requiring a nonstandard bandwidth.

There are a number of advantages with the broadband communications system as described. It uses the reverse band efficiently and uses only that portion of the forward band which is necessary. Digital QPR and QPSK modulation is used to permit digital and telephony services to the subscriber and provide a robust signaling method allowing the forward or reverse signals to be placed anywhere in the CATV band, either at high or low frequencies without signal to noise ratio concerns. Moreover, in the forward direction, the carrier signals are minimized so that carrier overloading does not occur and that the 3 MHz channels can be placed where space is found.

Figure 3C:
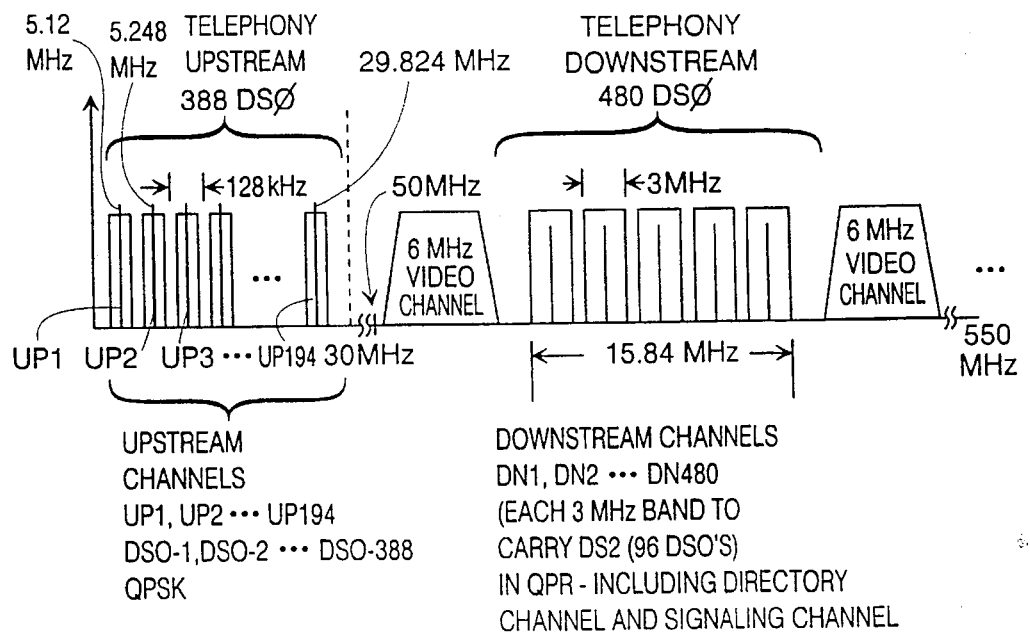
FIG. 3C is a pictorial representation of the frequency allocation of an alternative embodiment of the broadband communications system.

FIG. 3C illustrates an alternative frequency allocation for a split band CATV network that is implemented in an alternative embodiment of the present invention, described in connection with later figures. As in prior embodiments, the frequencies used for television programming that generate the revenues for the system operator are generated in the forward band from 50 MHz and above. The spectrum in FIG. 3C includes the reverse band from about 5 MHz to about 30 MHz. The 5–30 MHz band is used for upstream telephony signals in the form of 388 DS0's, combined to form DS0 pairs and QPSK modulated in 128 kHz upstream channels or subbands designated UP1, UP2, . . . UP194, where each upstream channel UPn carries 2 DS0's. Thus, in order to accommodate 388 DS0's, 194 QPSK carriers or channels are required. Each of the upstream channels UPn consumes 128 kHz bandwidth, comprising 108 kHz of modulated signal space and 20 kHz of guard band. The modulated digital signals are as formatted as described in connection with FIG. 9B.

The downstream telephony is provided in downstream channels DN1, DN2 . . . DN480, each DN corresponding to a DS0. In the preferred alternative embodiment, a total of 15.840 MHz of bandwidth is provided in 3.168 MHz subbands, each 3.168 MHz subband carrying the equivalent of DS2 telephony signal (96 DS0's), in QPR modulation, formatted as described in connection with FIG. 9C.

Figure 4:
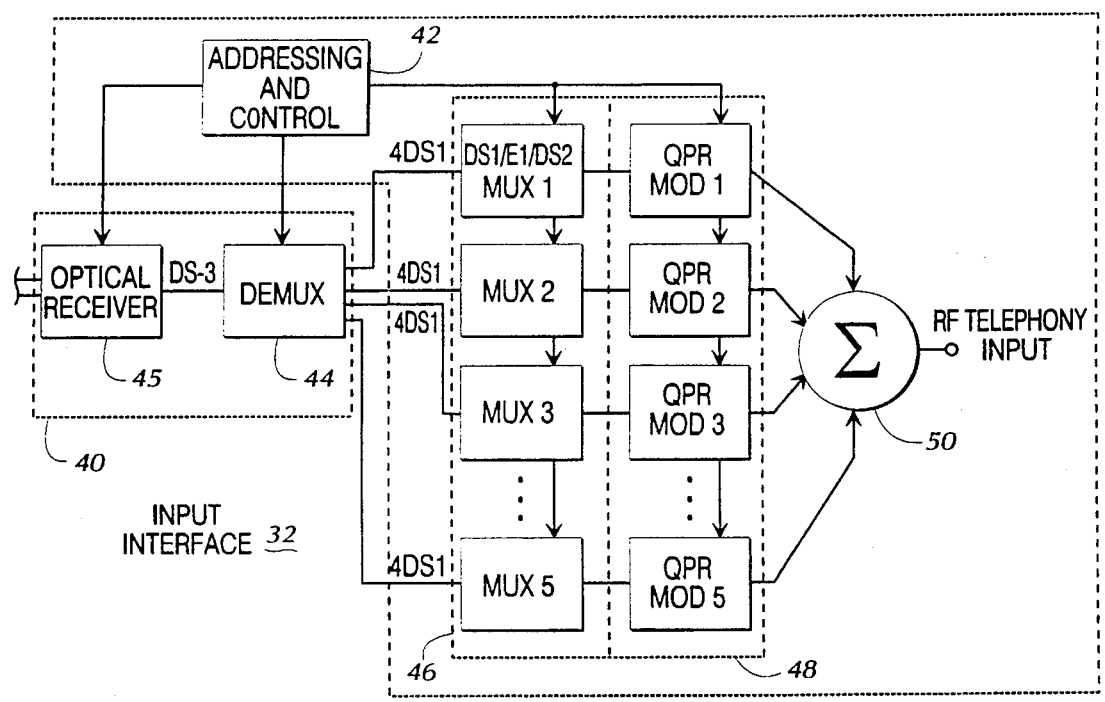
FIG. 4 is a detailed block diagram of the telephony network to the CATV network input interface of the system illustrated in FIG. 2.

A detailed block diagram of the input interface 32 is illustrated in FIG. 4. The function of the input interface 32 is to convert the 20 DS1 telephony signals into the five QPR modulated RF signals which are sent to the subscribers in the forward band of the CATV system 12. The input interface 32 is connected to an optical interface 40, comprising a fiber optic receiver 45 and a demultiplexer 44. The fiber optic receiver 45 operates to convert the optical signal into an RF digital signal of a standard telephony format. The demultiplexer 44 receives the digital DS3 telephony signal and separates it into its 28 component DS1 signals, where each DS1 signal comprises 24 DS0 signals. The optical interface 40 also allows an addressing and control unit 42 to decode and strip overhead and framing bits from the signal.

The input interface 32 comprises a series of five multiplexers 46, which each take four of the DS1 signals from the demultiplexer 44 and combine them with signaling and addressing bits from the addressing and control unit 42 to form a 6.312 Mb/sec serial digital signal. Each of the five digital signals is modulated on a selected carrier frequency by an associated QPR modulator 48. The five telephony channels from the outputs of the modulators 48 are frequency division multiplexed together in an RF combiner 50 before being inserted conventionally on the CATV network 12.

The output interface 34 will now be more fully described with reference to FIG. 5. The output interface 34 functions to convert the 480 DS0 digital signals which are QPSK modulated on the reverse band carriers into the optical format for coupling to the telephony network 10. The output interface 34 extracts the reverse band signals in a conventional manner and fans them out with a signal divider 60 to a plurality of tuner/demodulators 62. Each of the tuner/demodulators 62 is adapted to tune one of the carrier frequencies of the reverse band signals and demodulate it into a DS0 format digital signal. The tuners of the tuner/demodulators 62 can be variable or fixed, or can be adapted to tune only certain bands of the reverse spectrum. The output of the tuner/demodulators 62 is 480 DS0 signals which are concentrated into groups of DS1 signals by a group of multiplexers 64 under the control of addressing and control unit 66.

Each of the multiplexers 64 inputs 24 DS0 formatted signals and outputs one DS1 formatted signal to a fiber optic transmitter 49. At the fiber optic transmitter 49, the 20 DS1 signals are concentrated by a multiplexer 68 into a single DS3 digital signal which is input to the optical transmitter 70. The addressing and control unit 66 adds the necessary control information in the optical transmitter 70 before communicating the digital DS1 signals in an optical format. The optical transmitter 70 also converts the RF signal into light so the optical fiber of the telephony network can transmit it.

Figure 6:
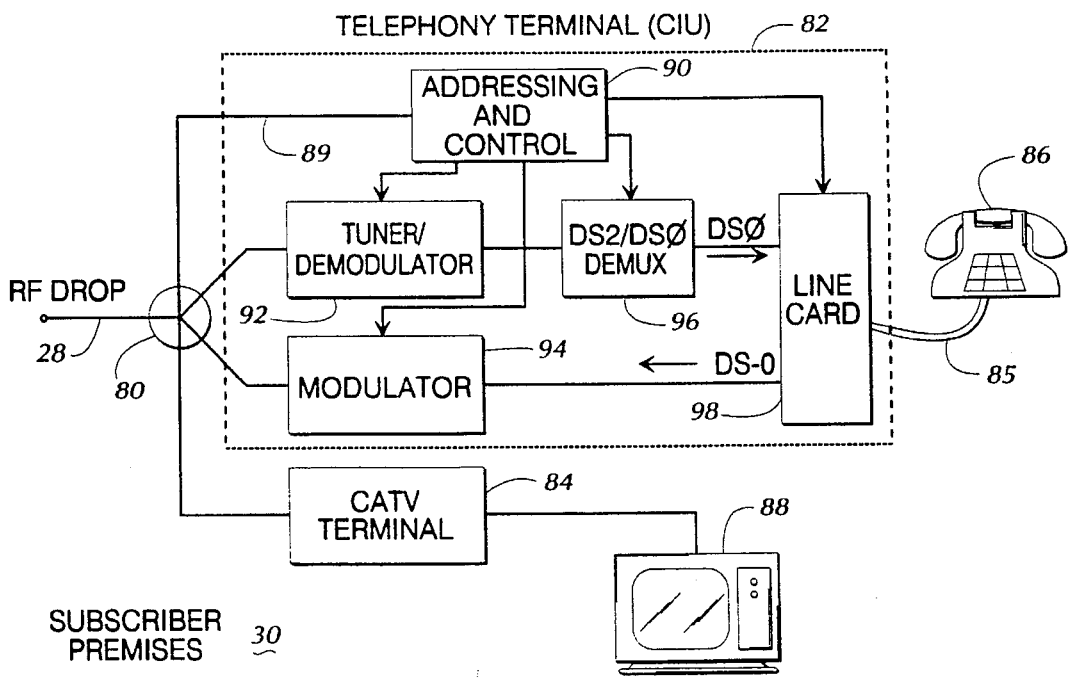
FIG. 6 is a detailed block diagram of a telephony terminal for receiving telephony signals from the telephony network through the CATV network and for transmitting telephony signals to the telephony network through the CATV network.

A detailed block diagram of the system equipment at the subscriber premises 30 is shown in FIG. 6. Generally, the subscriber will want to maintain CATV video or other services and has a CATV terminal 84 for this purpose connected between the CATV drop line 28 and a television receiver 88. The CATV terminal is connected to a splitter/combiner/diplexer 80 coupled to the drop 28 from one of the CATV coaxial subnetwork feeders.

Because the presently described broadband communications system does not interfere with or displace the conventional CATV programming and frequency allocations, the CATV terminal 84 can generally be used with no modification or change in operation of the installed terminal base. The system operator does not need to change or reconfigure its distribution network operation and the new telephone service is compatible with its installed CATV subscriber terminal base.

The broadband communications service is provided by coupling a telephony terminal, also called a "customer interface unit" 82, between the splitter/combiner/diplexer 80 and the telephone equipment 86. The customer interface unit 82 converts the incoming telephony signals to a subscriber into analog signals which can be used by a standard telephone handset 86 over a pair of twisted wires 85. Further, the customer interface unit 82 converts the analog signals, representing outgoing telephony signals from the handset 86, into a QPSK modulation which is coupled to the CATV network. A standard telephone handset 86 is shown for the purpose of illustration but could in fact be any equipment normally connected to a telephone line for digital communications purposes.

The telephony terminal 82 has two communication paths. The first path for incoming signals comprising a tuner/demodulator 92, demultiplexer 96, and a portion of line cards 98a-n and a second path for outgoing signals including a portion of the line cards 98a-n and a plurality of modulators 94a-n. The tuner/demodulator 92, modulators 94, demultiplexer 96, and line cards 98 are under the control of an addressing and control unit (CPU) 90.

For incoming telephony signals which are received in the 3 MHz channels modulated on an FDM carrier, the control unit 90 causes the tuner/demodulator 92 to tune the carrier on which the particular call information directed to the subscriber is carried. The carrier defines one of the five 3 MHz channels having 4 DS1 or 3 E-1 telephony signals QPR modulated thereon.

The telephony signals are demodulated by the tuner/demodulator 92 into a serial digital stream containing the 4 DS1 or 3 E-1 telephony signals before being input to the demultiplexer 96. The demultiplexer 96 selects the particular DS0 digital telephony channel assigned to the subscriber at the input rate of 64 kb/s and inputs the data to an input terminal of the line card 98. The control unit 90 determines which forward telephony channel to tune and which DS0 signal to select from that channel from the signal and addressing information it receives by its connection to the splitter/combiner/diplexer 80 via line 89.

The DS0 digital format provides a voice channel with sufficient bandwidth for voice quality communications. The DS0 format is a 64 kb/s data stream of bytes forming timed samples of an analog voice signal. This produces a voice signal quantized to 8-bits per sample (256 values) at a sampling rate of 8 kHz and with a bandwidth of 4 kHz.

The line card 98 receives the digital telephony signal in the DS0 format and converts it to the proper analog voltages and signals to drive the telephone handset 86. In addition, the line card 98 provides ringing current, terminal identification, and other standard functions under the direction of control unit 90. The line card 98 receives the analog telephony signals from the telephone handset 86 and converts them into a digital DS0 format. Dialing signals and other addressing and control signals from the handset 86 are also digitized by the line card 98. The digitized outgoing telephone signals are then combined and formatted by the line card 98 into a DS0 format at 64 kb/s and input to the modulator 94.

The modulator 94 under the regulation of the control unit 90 selects a carrier frequency in the reverse band and QPSK modulates the DS0 telephone signal thereon. The QPSK modulated carrier having a bandwidth of approximately 50 kHz is coupled on the CATV network through the splitter/combiner/diplexer 80.

Figure 7A:
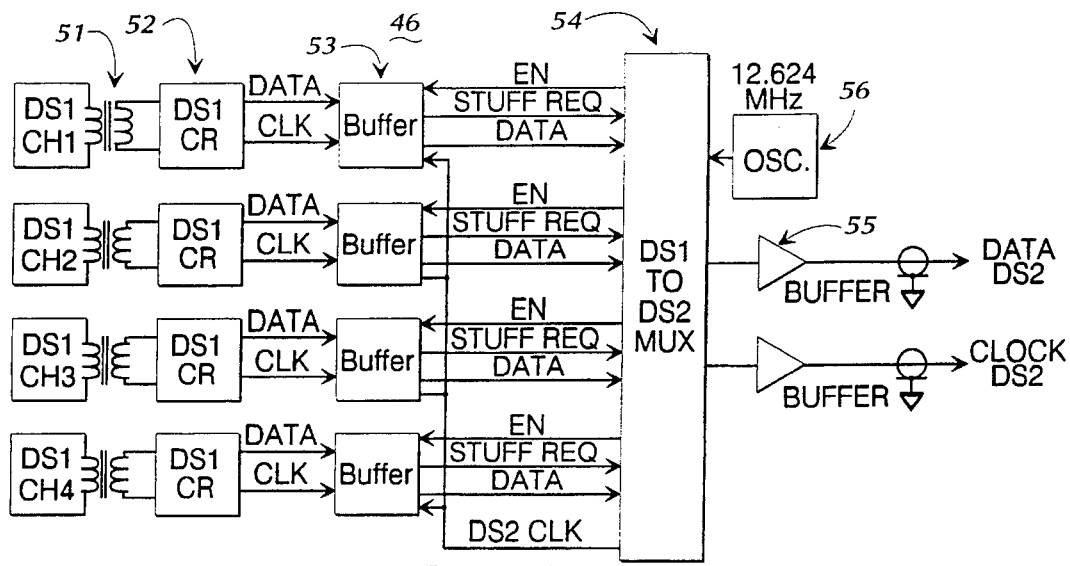
FIGS. 7A and 7B are detailed block diagrams of the DS1 to DS2 multiplexer of the input interface illustrated in FIG. 4.
Figure 7B:
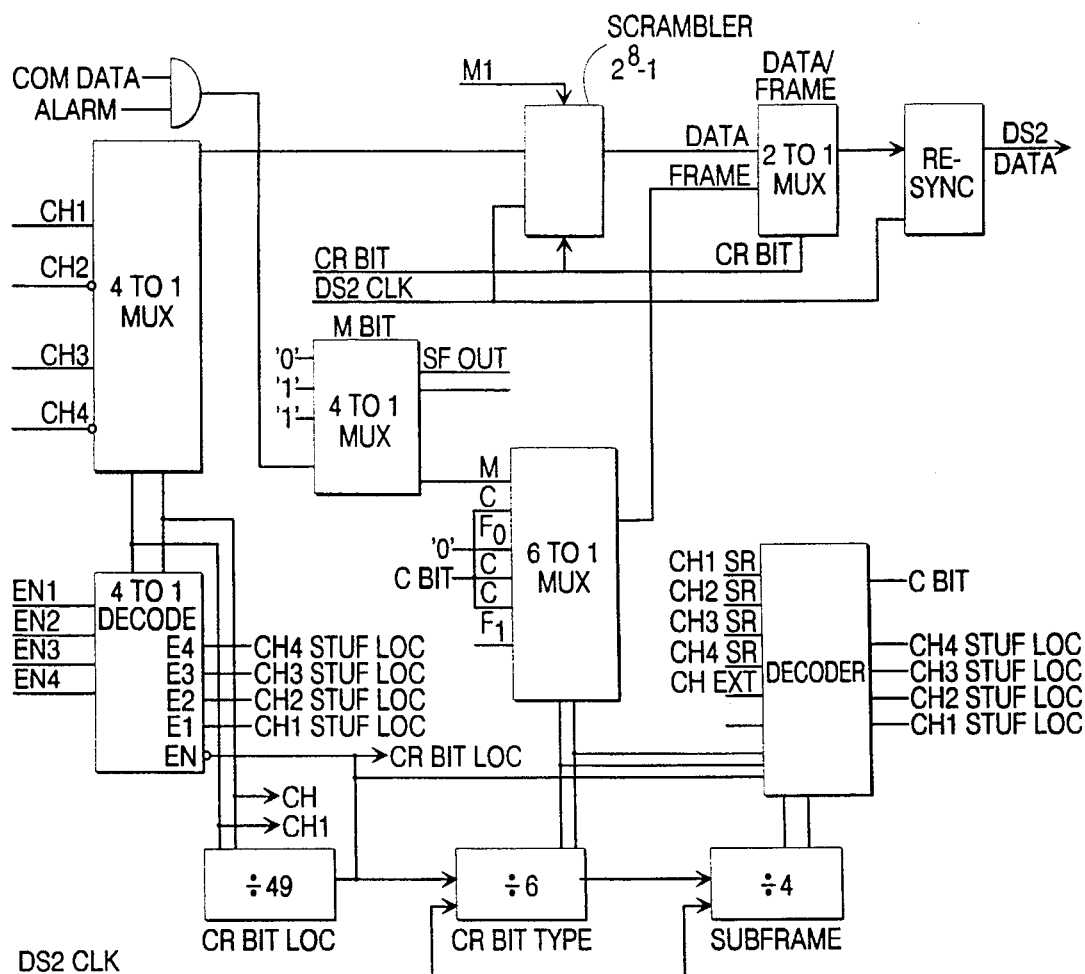

FIGS. 7A and 7B illustrate a detailed block diagram of the conversion means for converting 4 DS1 digital format signals into a DS2 digital format signal. Each of the DS1 signals, if delivered by a standard telephony optical receiver such as the fiber optic receiver 45 shown in FIG. 4, will be at analog voltages and differentially for transmission over a subscriber loop. This signal is transformed into digital signal levels by a transformer 51 which then serves as the input to a clock recovery circuit 52 separating the DS1 signal into a data stream and clock pair. The data and clock pair at the DS1 data transmission rate are input to an 8-bit buffer 53. The buffers 53 are to allow for the time base change from the DS1 data rate to the DS2 data rate in a multiplexer 54. The multiplexer 54 takes the data from each of the four buffers 53 and multiplexes them into a single channel of data output through a buffer amplifier 55 to the QPR modulator 48. The clock for the DS2 format data is derived from an oscillator 56 which drives the multiplexer 54.

Each of the buffers 53 are enabled to transmit data to the multiplexer 54 by indicating that they are almost full, which is termed a STUFF REQ. When this condition occurs, the buffers 53 are enabled to transmit the data at the DS2 data rate until they are empty enough to allow the DS1 signals to fill them again.

The multiplexer 54 comprises basically a 4:1 multiplexer which takes two of the DS1 channels in a non-inverted state and the other two in an inverted state and time division multiplexes them into a serial data signal which is then randomized by a PRBS randomizer. The randomized data is then framed by a data framer, and finally resynchronized to the DS2 data rate by the DS2 clock.

Control for the buffers 53 and the multiplexer 54 are provided by a multiplexer control comprising counters and decoders. The multiplexer control further controls two multiplexers which provide the data and framing bits for the DS2 signaling overhead at the correct times and correct places in the signal.

Figure 8:
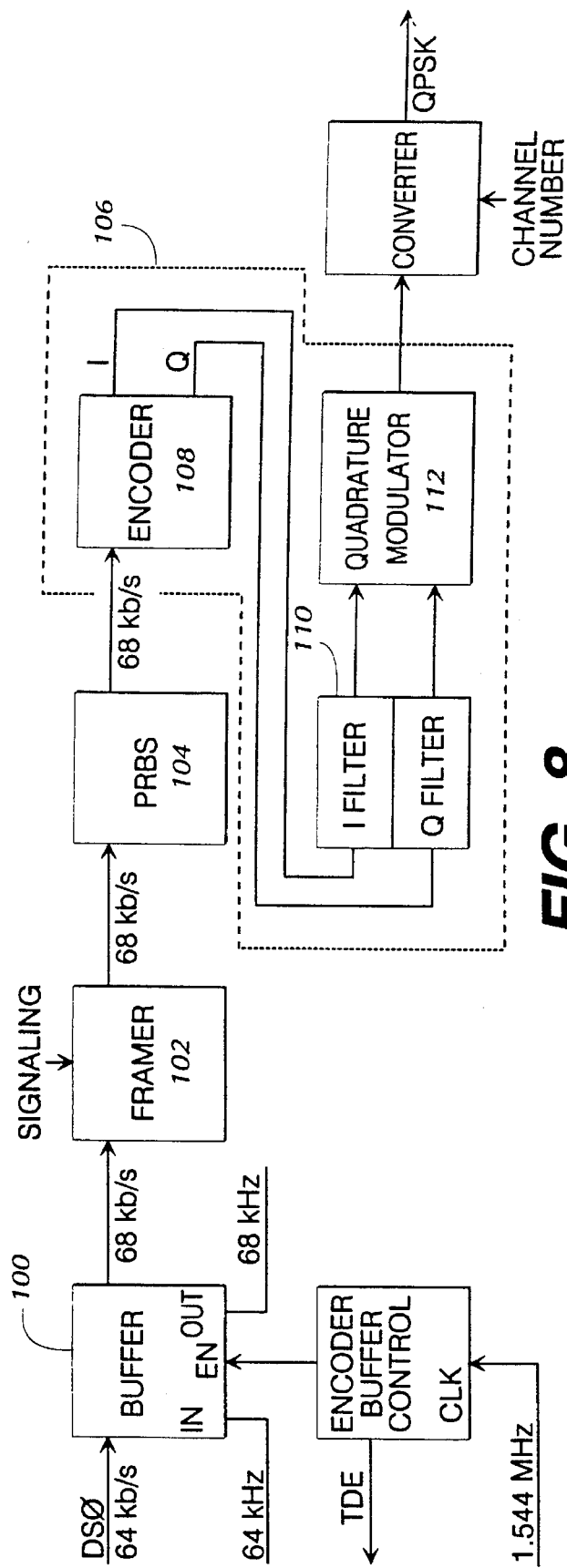
FIG. 8 is a detailed block diagram of a modulator for telephony terminal illustrated in FIG. 6.

A more detailed schematic diagram of the modulator 94 for each terminal is illustrated in FIG. 8. The modulator functions to change the data rate from the 64 kb/s voice signal at the line card to 68 kb/s, thereby allowing framing bytes to be added to the signal. The modulator also combines the data with a pseudorandom bit sequence (PRBS), which randomizes the data for transmission over the CATV network. The signal is then QPSK modulated on a carrier using differential encoding.

Referring now to the FIG. 8, the voice data, after being digitally encoded, is shifted into a three stage buffer 100 at 64 kb/s and shifted out of the buffer 100 at 68 kb/s. This allows an extra byte to be added to the data stream at 16 byte intervals to produce a subframe of 17 bytes. The specialized byte or framing byte is used for signaling, frame recognition, error detection and correction, or the like.

When the data stream has been increased in frequency, the signal is then framed in a framer 102 which inserts the special framing bytes every 16 data bytes. The framing format is similar to the European E-1 format where bytes are added to a data signal in even and odd frame times. Two reasons for this is because the DS0 format is already byte oriented, and bunched framing sequences are easier to frame on the nonbunched sequences.

Then, a randomizer 104 acts on the data to distribute the energy of the signal over longer time periods. It is known that such randomization is beneficial for the clock recovery circuits of the demodulators at the central or headend location. The randomization is accomplished by generating a pseudorandom bit string (a "PRBS"), and then adding it byte by byte to the data signal. The longer and more random the string, the more randomizing effect that such operation has on the data. The PRBS can be generated in many ways, but the simplest is with a shift register which continually recirculates the sequence wherein the preferred implementation a 127 bit pattern is used. The output, as is well known, can be derandomized by subtracting the same sequence in the same order which it was added to the bit stream.

The illustrated framing sequence or data format for the preferred embodiment is shown in FIG. 9A. The framing sequence or data format for an alternative embodiment of the invention is shown in FIG. 9B and FIG. 9C, which is discussed below in connection with the alternative embodiment.

In FIG. 9A, the framing is organized as even and odd subframes of 17 bytes and where there are different frame alignment sequence (FAS) bytes for each. The subframes are grouped into a multiples of 8 in a multiframe or superframe to allow for higher level activities such as CRC computation. The framing sequence is x0011011 in the even subframes, and x1xxxxxx in the odd subframes. The don't care (x) bits may be used for special conditions but are not important for framing. The framing patterns use both the primary and secondary FAS values to insure no false framing locations appear in the data. The primary FAS must have 7 bits to match while the secondary FAS has only one bit, but it is in a location where the primary has a zero. If the primary pattern is encountered in the data, then the chances of a data one being encountered simultaneously in the secondary FAS are low.

The framer 102 can be operated in two modes, one with a cyclic redundancy code (CRC) and one without a CRC. If the first bit in each of the FAS bytes is always one, then a CRC is not used and there are only two subframes (no multiframe). If the first bit in the odd subframes is the pattern shown in FIG. 9, then the CRC multiframe is recognized. The definition of the multiframe allows carrying of a CRC remainder in the first bit of the FAS in the even subframes.

The bits C1, C2, C3 and C4 will carry a CRC-4 remainder for the previous frame. The CRC computation is $X^4+X+1$ which is defined by the CCITT G.704 for use with the E1 telephony format. The CRC computation will indicate the quality of the data transmission. This framing format allows for alternate use of each channel as a data transmission channel. Any 64 kb/s data stream can be transmitted (data or voice), which will allow for support of direct digital services (DDS).

One of the primary advantages of the present invention is its frequency agility, and the ability to allocate bandwidth to subscribers on demand. The frequency agile feature is preferably provided in the reverse band of the communications system, and is operative for modulating a telephony signal from a subscriber in one or more frequency subbands in the reverse band of the subscription network so as to provide selectably variable bandwidth in the second band commensurate with selected subscriber communication features. For example, a subscriber can subscribe to a single voice grade line telephone service, plural voice grade telephone line service, ISDN telephone service, local or wide area network communication services (e.g. ETHERNET, Appletalk), security monitoring communication services, or the like.

The DL bits form a 500 bits per second data link. The data link will use an HDLC level formatter to send message packets or bit oriented status information. The AL bit is an Alarm bit which indicates a problem at the line card. A data bit value of 1 signals no Alarm, and a data bit value of 0 signals Alarm. The bits A, B, C and D are the signaling bits which provide for sixteen possible signaling states. It is evident that more states can be defined by toggling the bits at certain rates. The signaling bit definitions are: bit A=1 on hook; bit A=0 off hook; bit B=1 not ringing; and bit B=0 ringing. The status of the appropriate status detector will be read once every 4 ms and inserted into the proper bit locations in the odd FAS.

The RF modulator 106 accepts a 68 kb/s data stream to QPSK modulate a RF carrier (5 MHz to 30 MHz) and transmits the information via the coaxial cable subnetwork in a 50 kHz channel to the headend. The digital data is split into I and Q channels by the encoder 108 and differentially encoded to remove phase ambiguity in the carrier recovery at the receiving end. The I and Q channels of encoded information are then filtered separately in filters 110 to ensure that the data can be transmitted with a minimum of intersymbol interference. The filters 110 are digitally implemented and approximate a raised cosine filter with an alpha=1.5. Separate filtering at baseband allows for lowpass filters to be used instead of a more complex bandpass at the output of the modulator.

The I and Q signals are then amplified to appropriate levels in order to assure proper operation of the mixers. The quadrature modulator 112 generates two phase locked IF carriers, 90° out of phase, each of which are PSK modulated with one channel of the encoded and filtered data.

The two channels are recombined to produce a quadrature signal and amplified prior to being frequency translated to the appropriate transmit channel. The translation operation is frequency agile, and the transmit channel is programmable through the forward data link. The transmit signal is then amplified by a buffer amplifier, thus permitting a fully loaded system with 480 channels to produce approximately the same loading as would 5 video channels in the reverse band.

Figure 10:
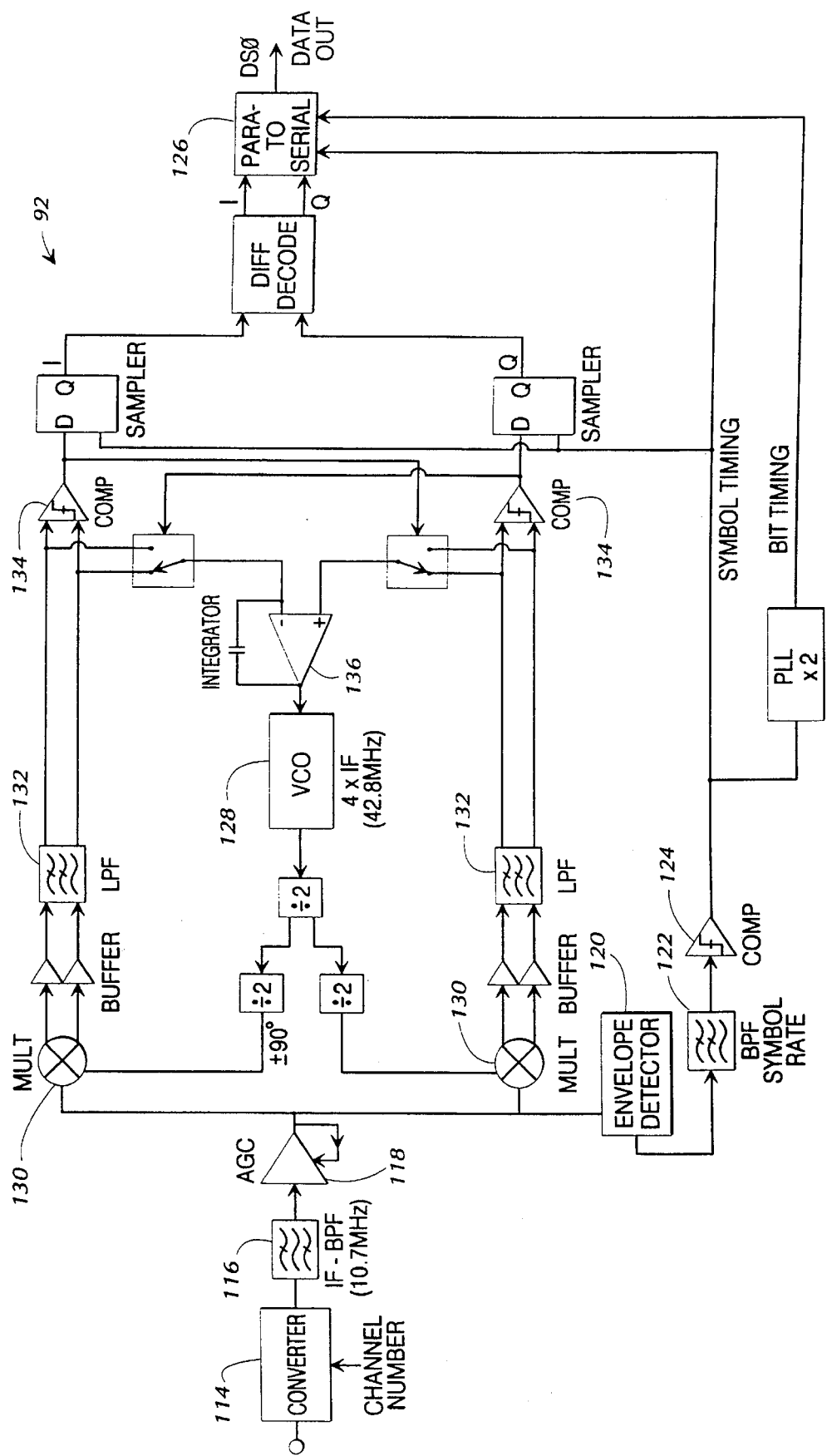
FIG. 10 is a detailed block diagram of the demodulator of the tuner/demodulator of the output interface illustrated in FIG. 5.

The demodulator 480 for the QPSK signal, which is 50 kHz in bandwidth, will be more fully described with reference to FIG. 10. The particular carrier frequency in which the QPSK signal is modulated is tuned by a converter 114 having as an input the channel number from the address and control unit 90. The converter 114 selects the particular frequency and converts it to an intermediate frequency, preferably 455 kHz. The intermediate frequency signal is filtered by a band pass filter 116 and then amplified by an amplifier 118 with automatic gain control. The clock for the QPSK signal is recovered through an envelope detector 120 and a band pass filter 122 which passes the symbol rate, in this case 32 kHz to a comparator 124. This clock is used to clock two D-type bistables which sample the I and Q phases of the QPSK signal. The samples of the I and Q phases are differentially decoded and then converted from parallel to serial in converter 126 and thereafter output as a 64 kb/s digital signal.

The demodulation takes place in a two path demodulator which multiplies each phase of this signal by a recovered carrier from a VCO 128. The VCO 128 is nominally at four times the symbol rate and is divided into an in-phase path and a quadrature phase path. One phase of the carrier signal is applied to a double balanced modulator 130 which produces a balanced output demodulated signal and its inverse, which are then filtered by a low pass filter 132 and differentially compared by a comparator 134 to become the input to the D-type bistable. The other phase of the carrier is applied to a multiplier which demodulates the intermediate frequency signal by the recovered carrier and then low pass filters the result and applies it to a comparator. The output of the comparator becomes the input to the D-type bistable where it can be sampled at the symbol time to decode the value of the bit.

The carrier is recovered by driving the voltage control oscillator 128 from the output of an integrator 136 which differentially compares the phases of each of the demodulated signals and their inverses through multiplexers. The multiplexer inputs are selectively controlled from the values of the signal channel and inverse outputs.

In summary, the present invention provides for broadband communications including digital communications, telephony, and telephony-related services by utilizing a CATV system in an efficient manner, while not requiring extensive switching equipment and a redesign of such systems. The broadband communications system requires no switching in the normal context when connecting telephony based calls from a subscriber or to a subscriber. A multiplicity of calls can be placed through the system efficiently using the broad bandwidth of the CATV network to utilize its best features and having the switching for the connection of the calls performed by the telephony network to utilize its best features.

There are two types of telephony calls in the broadband communications system, where one is an incoming call and the other is a outgoing call. With combinations of these types of calls, all the necessary connections to or from another telephony set and to or from a CATV network subscriber can be made. The subscriber may call (or be called by) another subscriber within the CATV network system, may call (or be called by) a local telephone set within the local area of the telephone network, or may call (or be called by) the telephone network to interface to the long distance and international telephony systems.

An incoming call is directed to a particular subscriber of the CATV network by the telephony network recognizing that the call is directed to one of the group of subscribers belonging to the CATV network. The call is then switched by the telephony network to the OC-1 or other standard telephony signal coupled to the CATV network in the time slot assigned to that subscriber. The addressing and control system of the CATV network then decodes the multiplexed information and translates it into a frequency and time position in the forward multiplex that has been assigned to the particular subscriber. The addressing and control system further provides the necessary control for causing the subscriber equipment to ring or alert the subscriber of an incoming call.

The telephony network and CATV network maintain the connection until there is an indication of an "on hook" signal by one of the parties or another signal that indicates that the communication is complete, such as an end of message data pattern or the like. What is meant by maintaining the connection is that the telephony network continues to place the called party's data packets into the assigned DS0 position in the standard telephony signal and the broadband communications system continues to convert them to the location and frequency in the forward multiplex that is directed to the particular subscriber.

For outgoing calls, the telephony network recognizes from the DS0 position in the standard telephony signal which data packet belongs to a particular originating subscriber of the CATV network. This is an assigned position and the CATV system converts data on whatever carrier frequency is input to the demodulators to that assigned position in the reverse multiplex. Therefore, for outgoing calls the telephony network will consider the standard telephony signal as a group of individual DS0 signals, whose location in the reverse multiplex identifies the originating subscriber.

Alternative Embodiment—Selectable Bandwidth Allocation

Figure 11:
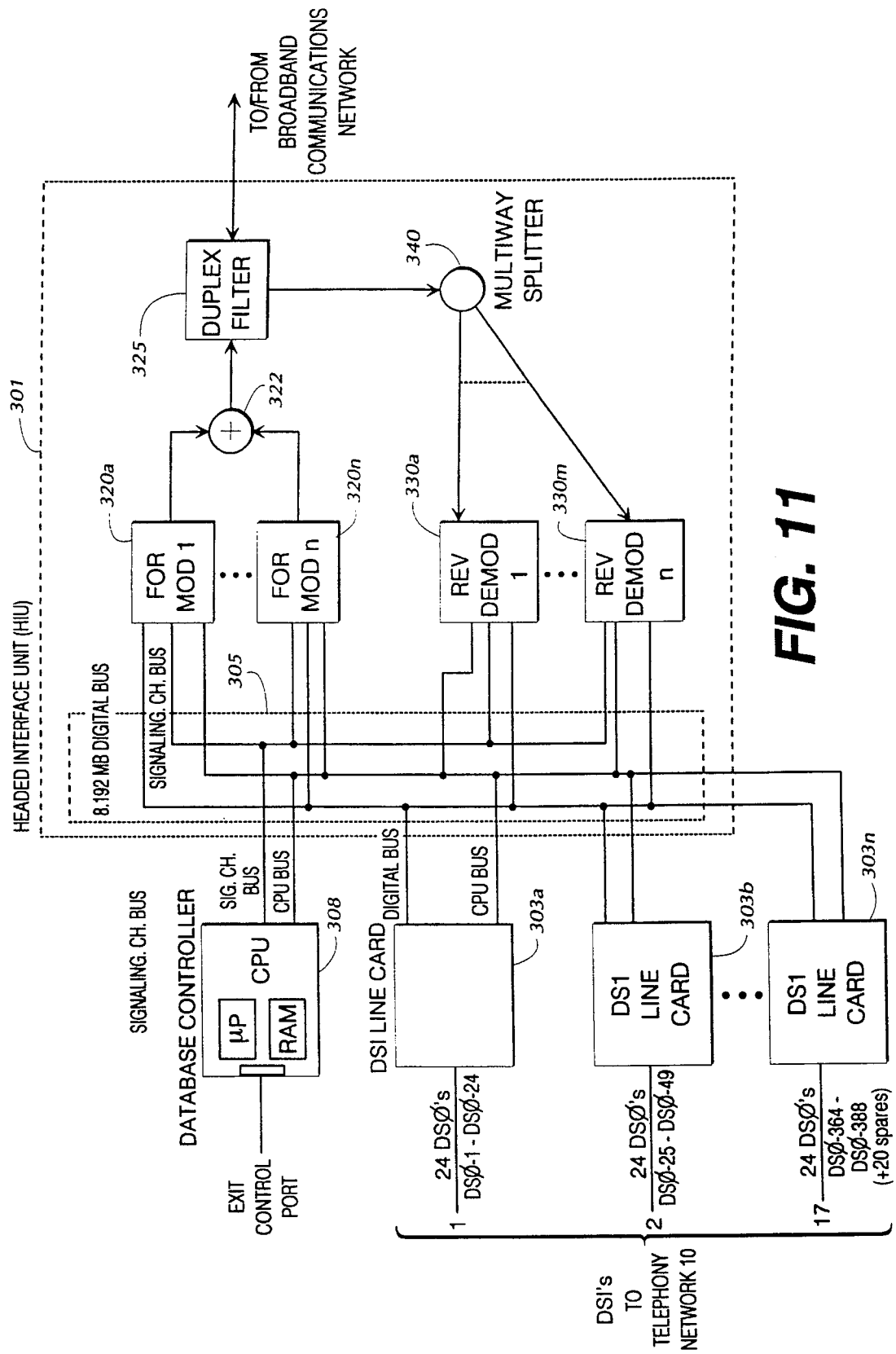
FIG. 11 is a block diagram of a headend interface unit (HIU) constructed in accordance with an alternative embodiment of the present invention.

Turning next to FIG. 11, the preferred embodiment of a headend interface unit (HIU) 301 constructed in accordance with an alternative embodiment of the present invention will be described. The alternative HIU 301 is suitable for use either as equipment comprising the headend 14 or equipment comprising the fiber node 16 shown in FIG. 1, both of which are operative for receiving multiplexed digital telephony signals in a standard telephony format such as DS3, DS2, DS1, and coupling such signals to an input interface 32, 36 or an output interface 34, 38. Although the preferred embodiment is described in connection with a coaxial line HIU, it will be understood that the principles are applicable for an optical-fiber based HIU that employs methods for communicating broadband signals via amplitude modulation (AM) methods, such as described in U.S. Pat. No. 5,262,883, which is owned by the assignee of the present invention. Briefly described, the HIU 301 is operative for connecting to a telephone company (telco) standard multiplexed telephony signal, directing incoming telephony signals to subscribers downstream on the broadband network using QPR modulation in the forward path, and receiving outgoing telephony signals from subscribers upstream on the broadband network in one or more selected subbands within the reverse path spectrum, commensurate with service levels or features elected by subscribers.

Figure 5:
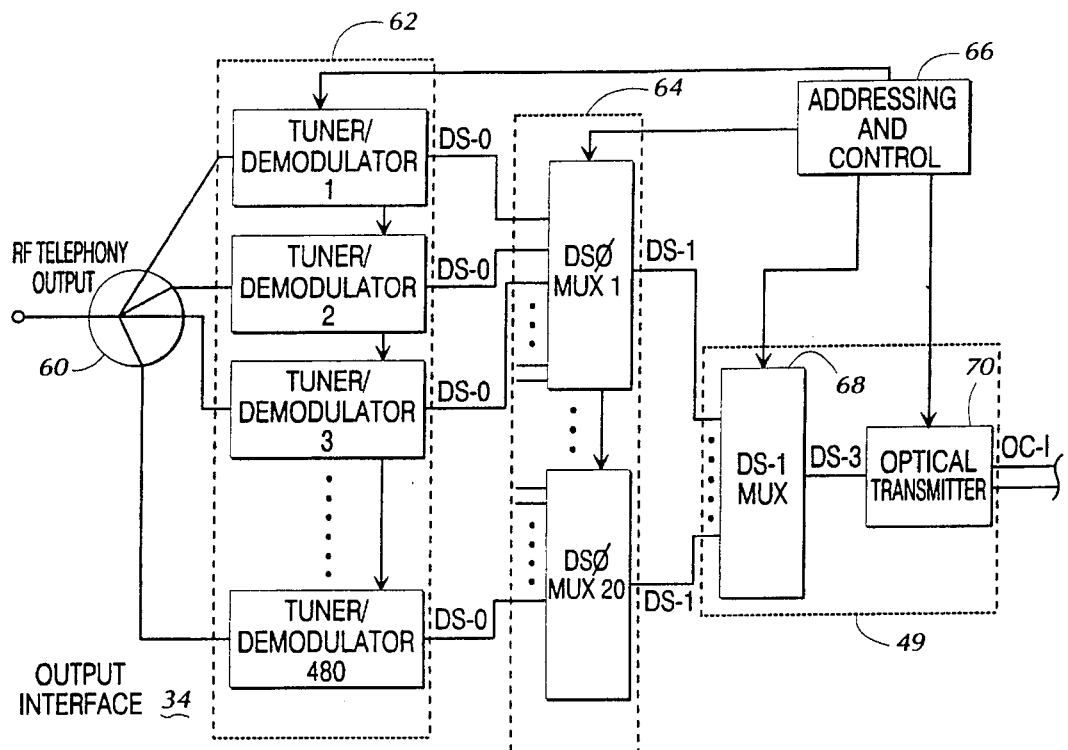
FIG. 5 is a detailed block diagram of the telephony network to the CATV network output interface of the system illustrated in FIG. 2.

The alternative HIU 30 1 shown in FIG. 11 is a presently preferred embodiment involving the use of digital line cards 303 that provide digital signals to a digital bus or backplane 305, operating together with a central processing unit (CPU) 308 corresponding to the address and control unit 42 as shown in FIGS. 4 and 5.

The HIU 301 comprises a plurality of DS1 line cards 303a ... 303n, where n is 17 in the disclosed embodiment, for connection to the telephony network 10 or to a higher level multiplexer/demultiplexer capable of handling higher level multiplexing such as DS2 or DS3. It will be recalled that each DS1 corresponds to a T1 line, each T1 line comprises 24 DS0 standard telephony channels. For provision of 388 DS0's, therefore, slightly more than 16 DS1's must be accommodated. With 17 DS1 line cards 303, a number of lines are provided as spares.

Each DS1 line card 303 provides interfaces compatible with ANSI Doc. T1.403 (1989 version), which is incorporated herein by reference and made a part hereof. Each line card 303 provides a digital output signal that is coupled to the digital backplane 305. The backplane operates to connect all of the line cards 303 and route signals between the line cards and the forward and reverse path modulators, to be described. The backplane 305 preferably comprises up to five 8-bit serial digital busses each clocked at 8.192 MHz. Each bus thus provides an 8.192 Megabit per second (Mb/s) digital pathway that is operative to receive digital signals from each of the line cards in a time division multiple access (TDMA) format. It will be appreciated that five 8.192 Mb/s digital busses in parallel are sufficient to handle the 388 separate 64 kbps signals.

The backplane 305 further includes a CPU bus coupled between a CPU 308 utilized as a database controller and each of the line cards 303 The CPU 308 is operative to control the assigned relationships between particular telephony lines, ingoing and outgoing, with predetermined carrier assignments in the reverse path and in the forward path, monitor the noise level in the reverse path, and assign DS0 channels in the reverse path commensurate with subscriber features and the like. Further, the CPU 308 is operative to carry out steps described below of monitoring noise in the reverse pathway channels as described in connection with FIG. 16, and dynamically allocate bandwidth as described in connection with FIG. 17, and to maintain in memory a service level table as shown in FIG. 15 that indicates the correspondence between reverse channel carrier frequencies, subscriber identification, service level, telco DS0 identification, signaling status, error count for noise monitoring, and the like.

The preferred CPU 308 is a Motorola 68360 32-bit microprocessor with built-in memory (DRAM) controller and is operatively connected to 2 MB of random access memory (RAM). Details of the preferred CPU are available in the literature supplied by the manufacturer.

Still referring to FIG. 11, the backplane 305 further includes a signaling channel bus connected between the CPU 308 and each of a plurality of forward channel modulators 320 and reverse channel demodulators 330. The signaling channel bus communicates status information associated with a telephony line such as off hook, on hook, busy, ring, security status, and the like. Bits associated with particular status states of the subscriber's telephone and of the associated telco line are included and combined with digitized telephony signals and transmitted to the CIU's 400, as described below.

In the disclosed embodiment, the HIU 301 comprises a plurality of forward channel modulators 320a . . . 320n and a plurality of reverse channel demodulators 330a . . . 330m. The forward modulators 320 couple outgoing telephony signals to the broadband network in the forward spectrum, while the reverse channel demodulators receive telephony signals from CIU's in the reverse spectrum via the broadband network. Each of the forward channel modulators 320 is connected to a combiner 322 that is operative to combine the RF signals from the forward channel modulator and provide an output to a diplex filter 325. The diplex filter 325 is preferably a bandpass filter that passes signals outward within the 15.840 MHz frequency forward spectrum provided in the alternative embodiment whose spectral allocation is shown in FIG. 3C. The output of the bandpass filter, whose frequency is centered at an appropriate location along the spectrum allocated for forward or downstream telephony signals, is then coupled to a multiway splitter 340 that is coupled to the broadband communication network.

It will be appreciated that the broadband communication network (not shown) connected to the multiway splitter can either be a coaxial cable network, or alternatively can be an additional fiber optic link that is amplitude modulated to carry the broadband signal in a manner known to those skilled in the art.

Still referring to FIG. 11, the HIU 301 further comprises a plurality of reverse channel demodulators 330a . . . 330m that are connected to receive signals from the multiway splitter 340. The reverse channel demodulators are similarly constructed, as described in connection with FIG. 14. A separate reverse channel demodulator is provided for each possible frequency allocated in the reverse spectrum for upstream telephony signals; in the disclosed embodiment, therefore, m=194.

The multiway splitter 340 preferably includes at least one lowpass filter segment that isolates the signals in the 5–30 MHz range designated in the alternative embodiment for reverse path telephony signals.

Figure 12:
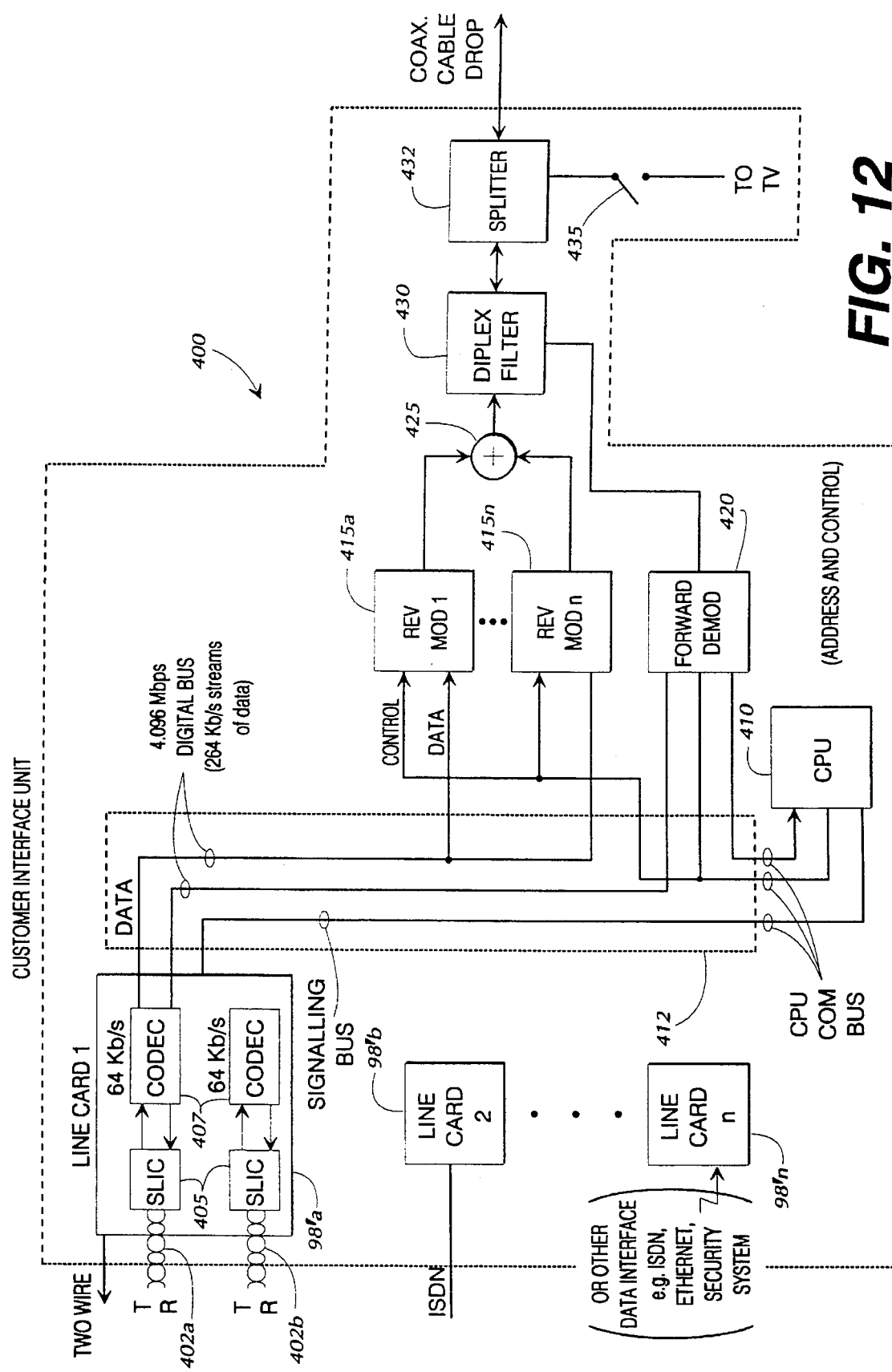
FIG. 12 is a detailed block diagram of a customer interface unit (CIU) constructed in accordance with an alternative embodiment of the present invention.

FIG. 12 illustrates a frequency agile customer interface unit or CIU 400 constructed in accordance with the alternative embodiment of the present invention. The CIU 400 is utilized in the same manner as described in connection above with the telephony terminal 82, and includes the same basic components as described in connection with FIG. 6. However, there are certain differences, as will be described.

The CIU 400 is especially adapted for utilization with selectable bandwidth features or services that may be subscribed to by subscriber, e.g., single line telephony service, multiple line telephony service, ISDN service, data communications service, local or wide area network of data communications such as ETHERNET, or the like.

In order to implement the on-demand selectable services and to accommodate the varying bandwidths for such services, the CIU 400 includes one or more line cards 98', which are constructed basically the same as the line card 98 shown in FIG. 6. The alternative line cards 98' are of varying types depending upon the nature of the service that is to be connected. For example, the line card in 98'a is adapted for two conventional voice grade telephony line 402a, 402b that comprise the conventional 2-wire twisted pair copper connections with tip (T) and ring (R) known to those skilled in the art. On the other hand, the line card 98'b is adapted for ISDN and includes a standard ISDN connector. Other types of lines cards 98'n may be provided for connection of other types of customer data service such as local area network data communications (e.g. ETHERNET), security monitoring systems, video teleconferencing, etc.

Thus, it will be understood that the line cards 98' include connectors suitable for the particular type of data service to be provided on behalf of the customer. For example, a line card configured for connection to a security alarm network will include a compatible physical connector for connection to the customer's alarm system network and will include circuitry for converting data from the alarm system network into the 64 kbps digital data stream provided for upstream communications.

The standard telephony line card 98'a includes a pair of subscriber line interface circuits (SLIC) 405 that are adapted to receive signals on voice grade telephony lines 402 and couple them to a coder/decoder (CODEC) 407 for digitization. The voice grade telephone lines 402 may be coupled to a subscriber's home wiring network so that a number of subscriber telephones connected in parallel may access a given telephone line.

The preferred SLIC's 405 are type AM7943 or AM7949, manufactured by Advanced Micro Devices in Sunnyvale, Calif. The CODECs 407 are operative to digitize the voice grade telephone lines into serial 64 kbps digital data. The preferred CODEC's 407 are preferably type AM79C02, manufactured by Advanced Micro Devices.

The output of the codec 407 comprises a digital serial data that is output in response to commands from a control CPU 410 that serves in a capacity corresponding to the address and control unit 90 in the embodiment shown in FIG. 6.

An ISDN-capable line card such as 98'b is substantially the same as the line card 98'a, except that the SLIC circuitry is operative to provide an appropriate ISDN connections, but still provides two 64 kbps digital data streams as outputs. The principal requirement of the line cards 98' are to provide a suitable physical connection for customer data in the form of standard output ports or connectors, and provide digital data streams as outputs in response to commands from the CPU 410. Further, plural line cards may be provided at any given customer premises, depending upon the particular types of services to be provided to the customer.

It will be understood that the nature of the service that is provided at any given CIU 400 must be preidentified and prestored in memory in the HIU 301 that is utilized as the telephony network interface, so as to enable provision of the selected service upon demand. In response to a request for service either originating with a subscriber at a selected CIU, or a request for incoming service to a subscriber originating externally to the network, status signals such as the subscriber going off hook, or a ringing condition on an incoming line, the system causes the selection and allocation of appropriate bandwidth, DS0 channels, reverse channels, carriers, etc., required to provide the selectably variable bandwidth commensurate with the selected service.

Still referring to FIG. 12, the line cards 98', whether one or many, are preferably connected to a backplane 412 in the CIU so that signals from the various line cards may be coupled to appropriate modulators and demodulators and receive control signals from the CPU 410. The preferred backplane 412 includes a 4.096 Mbps serial digital bus that is operative to transmit 64 kbps data in a TDMA manner from a selected CODEC 407 in a selected line card to a selected reverse channel modulator 415. There is also provided a second 4.096 Mbps digital bus for transmitting data from a forward channel demodulator 420 to selected CODEC 407 in a selected line card for outgoing transmissions. The CPU 410 is operative to control the selection of line cards, reverse channel modulators, and forward channel demodulators. While the preferred embodiment illustrates the use of two 4.096 Mbps digital busses in parallel, it will be understood and appreciated to those skilled in the art that a single 8.192 Mbps digital bus could also be used.

The backplane 412 in the CIU 400 further includes a signaling bus that couples control signals between the line cards 98' and the CPU 410. The signaling bus carries status signal associated with status of the telephony lines such as off hook, on hook, alarm, busy, ring, for inclusion as a part of the status information associate with the selected service.

Outgoing data from the line cards 98' are provided to reverse channel modulators 415 for provision to the broadband network. Each line card generally provides a pair of DS0 (64 kbps) data streams, which are combined and transmitted in the reverse path on a carrier by a single reverse channel modulator 415. Details of the preferred reverse channel modulator 415 are described in connection with in FIG. 13.

Incoming data from the broadband network is derived from at least one forward channel demodulator 420, which is operative to monitor a preassigned channel in the QPR-modulated forward channel utilized for incoming telephony signals. The preferred forward demodulator 420 operates in the manner described above to demodulate a QPR modulated forward channel signal in the designated telephony downstream subband of 15.840 MHz, and to monitor the directory channel and signaling channels provided as a part of the overhead data.

It will be noted that a plurality of reverse channel modulators 415a . . . 415n may be required to provide the appropriate bandwidth required for a given level of service. For example, if a selected service entails the equivalent of four DS0's, then there is the need for four reverse channel modulators 415. Furthermore, it will be recalled that each modulator 415 is frequency agile and is not necessarily operating at a given fixed upstream carrier frequency, since upstream channels can be reassigned dynamically and in response to changing conditions such as noise level and reallocation of bandwidth in response to the subscriber's needs.

The plurality of reverse channel modulators 415 are connected to a combiner 425 so that the RF output signal can be coupled to the coaxial cable. The output of the combiner 425 is connected to a diplex filter 430 that passes a signal in the 5–30 MHz range for coupling to a splitter 432 that is connected to the subscriber's coaxial cable drop. The diplex filter 430 is further operative to pass signals in the selected forward 15.840 MHz spectrum for downstream signals to the forward channel modulator 420 so that the directory channel, signaling channel, and downstream telephony DS0's may be demodulated and coupled to the appropriate line cards.

The splitter 432 is conventional and operates to receive signals from the diplex filter 430 in the 5–30 MHz reverse channel and couple them to the coaxial cable drop, to receive incoming downstream telephony signals in the forward frequency band and couple them to the forward channel demodulator 420, and pass signals above 30 MHz (in the conventional CATV programming spectrum) to the subscriber's television equipment.

It will be understood that the CIU 400 can be physically configured either as separate customer premises equipment located in or near a subscriber's telephony punch blocks, or as a CATV set top terminal including one or more RJ-11 or similar telephone connectors. Moreover, the CIU, since it includes a computer (CPU 410) and associated circuitry can be used for conventional CATV signal management such as pay-per-view control, descrambling, etc. Therefore, the preferred CIU, whether settop or separate circuitry enclosure, includes a control connection provided from the CPU 410 to a switch 435 associated with the signal line between the splitter 432 and the subscriber's television. This allows the programming signals to be disconnected from a subscriber in the event of non-payment or election not to receive a certain programming.

Finally, each CIU 400 is associated with a predetermined address in the network. This address is preferably maintained internally, in a read-only memory. The address of the CIU is a 64 bit digital number that is provided in the upstream channel to the HIU whenever the CIU requests service. The address information is utilized by the HIU to examine its service level table (FIG. 15) to identify the subscriber associated with the address information and determine the appropriate and authorized level of service to be provided. For example, when a telephone connected to the CIU goes off hook, the address of the CIU is transmitted in association with the off hook status information in the upstream channel to the HIU, where it is received and examined to determine the appropriate service level, DS0 assignments, frequency assignment, etc.

Figure 13:
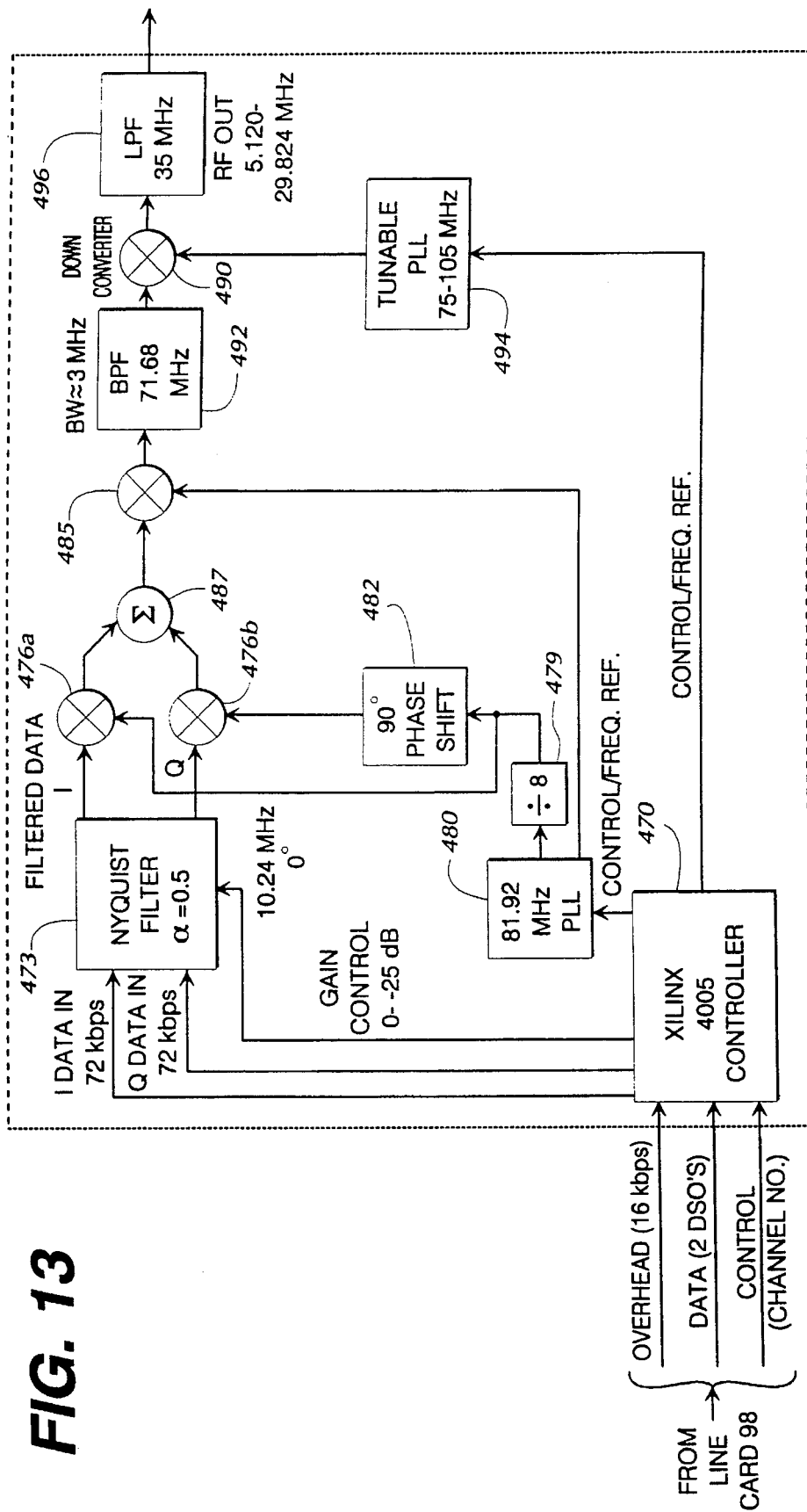
FIG. 13 is a detailed block schematic diagram of the reverse modulator utilized in the customer interface unit (CIU) illustrated in FIG. 12.

FIG. 13 illustrates a frequency agile reverse channel modulator 415 constructed in accordance with the alternative embodiment of the present invention. The reverse channel modulator 415 is operative to receive serial data input from the digital bus in a CIU in the form of two DS0's at 64 kbps, respond to controls signal from the CPU 410 (address and control unit), and modulate the incoming data into a selected channel in QPSK for coupling to the reverse channel frequency spectrum. The modulator is operative to provide the QPSK in a selected 108 kHz subband, at a selected carrier frequency.

The preferred reverse channel modulator is constructed around a XILINX digital controller 470, model no. XC4005, manufactured by Xilinx, of San Jose, Calif. The serial data controller 470 provides varying output signals to the other components as will be described.

The controller 470 receives the two 64 kbps signals from a connected line card 98' and separates the data into two signal paths, I and Q, for the quadrature phase shift keying modulation. The controller 470 also receives 16 kilobits of overhead, which includes the framing alignment sequence (FAS), the CRC remainder, and the data link that carries the signaling information. The output comprises an output signal I DATA IN at 72 kbps and Q DATA IN at 72 kbps. These are provided to a digital Nyquist filter 473 to obtain outputs designated FILTERED I DATA and FILTERED Q DATA. The controller 470 provides a gain control to the Nyquist filter varying between 0 and −25 dB to the filter 473.

The Nyquist filter 473 shapes the modulated spectrum so that it will fit in the 108 kHz occupied bandwidth with zero intersymbol interference. As a byproduct of the filter, gain control of 25 dB is obtained.

The FILTERED I DATA and FILTERED Q DATA outputs are provided to a pair of mixers 476a, 476b where the I and Q digital signals are beat with 10.24 MHz 90° phase-offset intermediate frequency (IF) subcarriers. This yields a pair of quadrature-related QPSK signals.

The 10.24 MHz IF carriers fed to the mixers 476 are derived from an 81.92 MHz phase locked loop (PLL) circuit 480 that is provided through a divide-by-eight (÷8) circuit 479 to obtain the 10.24 MHz IF subcarrier. The IF subcarrier is provided to the mixer 476a and through a 90° phase shift circuit 482 to the mixer 476b. The outputs of the mixers 476a, 476b are combined at a summing circuit 487.

The 81.92 MHz signal is also provided to a third mixer 485 which mixes with the signal from the summing circuit 487. The output of the third mixer 485 is provided to a band pass filter 492 having a passband of approximately 3 MHz centered at 71.68 MHz so as to attenuate unwanted mixing products from the first three mixers. The 71.68 MHz output signal is downconverted by a down converter 490 which beats the 71.68 MHz QPSK signal from the filter 492 with a 75–105 MHz RF carrier from a tunable phase locked loop (PLL) circuit 494 that serves as a frequency synthesizer. The output of the down converter 490 is then low pass filtered by a low pass filter 496 to limit the output signal to below 35 MHz. The RF output signal from the LPF 496 is a QPSK signal at a selected output frequency varying between 5.120 MHz and 29.824 MHz for the reverse channel, selected as a function of the frequency provided by the carrier emanating from the PLL 494.

The tunable PLL 494 receives its signal indicating the selected carrier frequency for the selected upstream channel UP1, UP2, etc. via a CONTROL/FREQ REF signal from the controller 470. As it has been described, the controller 470 receives the designated frequency for operation of the reverse modulator from a control signal received by monitoring the directory channel.

It will be understood that the described reverse modulator 415 shown in FIG. 13 may change its frequency very rapidly in response to commands from the HIU when it is determined that a particular carrier in the reverse channel is experiencing excessive noise.

Figure 14:
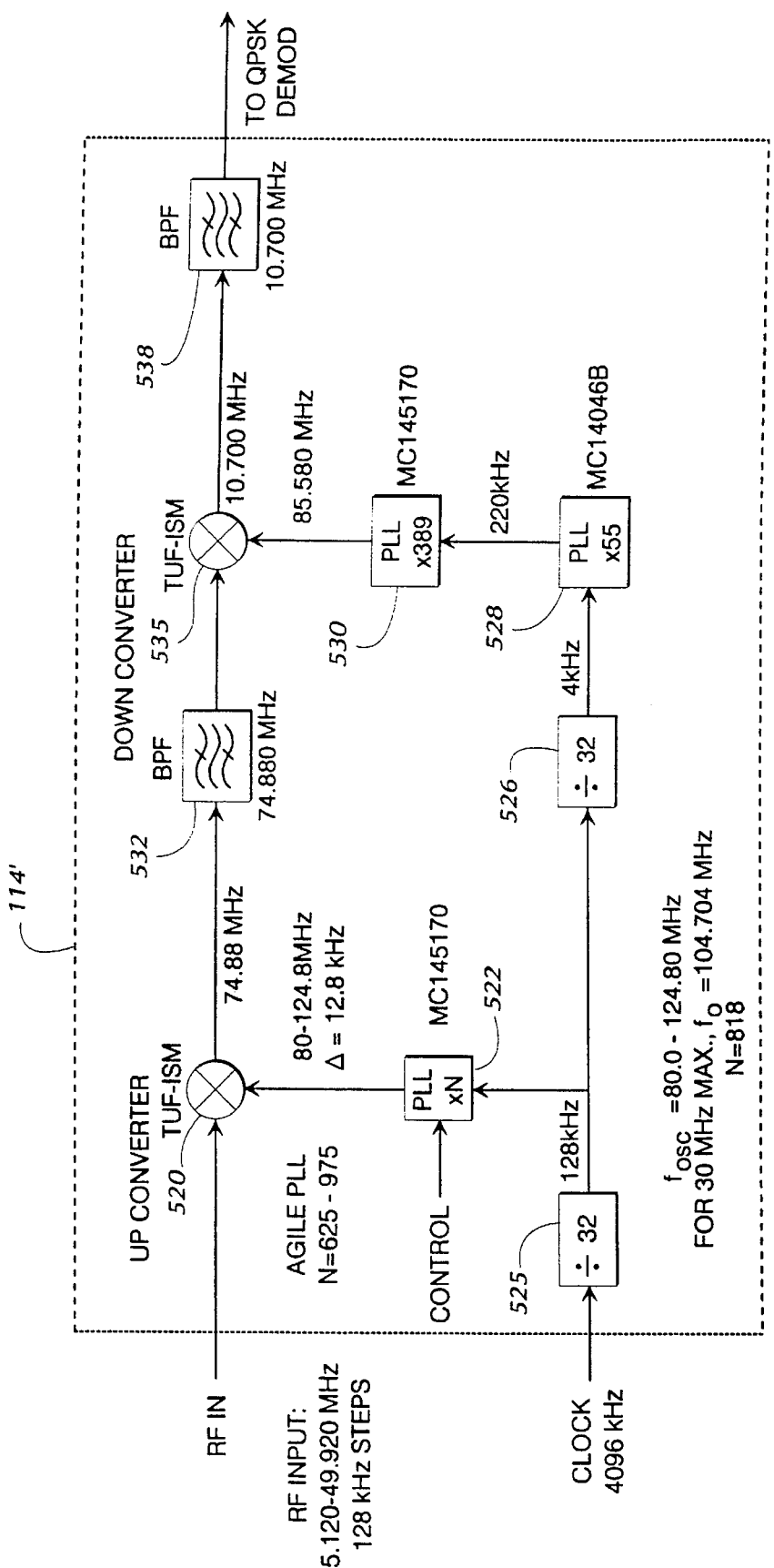
FIG. 14 is a detailed block schematic diagram of the reverse demodulator converter utilized in the headend unit (HIU) illustrated in FIG. 10.

FIG. 14 illustrates a frequency agile reverse channel demodulator converter 114' utilized in the HIU shown in FIG. 11. It will be understood that one of the reverse channel demodulator converters 114' is provided for each pair of DS0 signals provided in one of the upstream channels UP1, UP2 . . . UP194 as shown in FIG. 3C. The reverse channel demodulator converters 114', like their reverse channel modulator counterparts in the CIU, are frequency agile and can be selectively tuned to predetermined carrier frequencies in the telephony upstream bandwidth of 5–30 MHz range. The embodiment shown in FIG. 14 is preferably operative between 5.12 MHz and 49.9 MHz so as to allow for future expansion or utilization of the reverse channel bandwidth up to about 50 MHz, which would allow additional reverse channel capacity beyond the 388 DS0's of the described embodiment.

Each reverse channel demodulator converter 114' receives an RF input signal and provides it to an upconverter or mixer 520 where the incoming signal is beat with a selectively variable frequency between 80 and 124.8 MHz, that varies in increments of 128 kHz. The 80–124.8 MHz beat signal is derived from a phase lock loop circuit 522 which is preferably a type MC 145170 manufactured by Motorola. The PLL 522 varies its output frequency as a function of a CONTROL signal provided from the headend unit (HIU) 301. The PLL locks to a 128 kHz signal fed from a divide-by-32 (÷32) circuit 525, which is driven by a 4.096 MHz clock. The CONTROL signal from the HIU that is indicative of the frequency to which the circuit is tuned is provided on the signaling channel provided from the CPU 308 (FIG. 11). This signal varies from N=625 to 975, corresponding to output frequencies of 80.0 to 124.8 MHz.

The 128 kHz signal from the divide-by-32 525 is also provided to a second divide-by-32 circuit 526 that derives a 4 kHz signal provided to a second phase lock loop circuit 528. The output of the second PLL 528 is a 220 kHz signal that is then provided to a third PLL 530, which provides a stable 85.58 MHz output signal used for downconversion.

The reference frequency 4 kHz is first multiplied up to 220 kHz by PLL 528 in order to more easily attenuate unwanted spectral byproducts from the output of PLL 530. Unwanted reference frequency sidebands are therefore more easily filtered out since the reference frequency 220 kHz is more widely separated from the PLL 530's loop bandwidth (approximately 120 Hz) than it would be if the 4 kHz reference was used directly.

Referring back to the mixer 520, its output, which varies between 80 MHz and 124.8 MHz, is filtered through a bandpass filter 532 having a passband of approximately 3 MHz and centered at 74.88 MHz. The output of the bandpass filter 532 is provided to a mixer or downconverter 535. The downconverter beats the filtered input signal with the 85.58 MHz from the PLL 530. The output of the downconverter 535 is a 10.7 MHz signal that is band pass filtered by an output band pass filter 538, whose output is a 10.7 MHz carrier QPSK modulated signal that has been retrieved from a selected 128 kHz subband within the 5–30 MHz reverse frequency range.

The output signal from the reverse demodulator converter 114' is then provided to a conventional QPSK demodulator that operates in the known manner to obtain the digital output signal comprising a pair of DS0's at 64 kbps, as has been described.

It will be noted that the frequencies selected by the PLL 522 between 80–124.8 MHz is chosen such that the output signal at 74.88 MHz is the selected signal containing the desired telephony signal in the particular selected reverse channel subband 128 kHz wide.

Turn next to FIG. 15 for a discussion of the manner in which varying levels of the service are provided to a subscriber commensurate with a selected level of service and allocation of appropriate commensurate bandwidth to effect the service. The information illustrated in FIG. 15 is stored in the CPU 308 in the headend interface unit (HIU) 301 illustrated in FIG. 11. The CPU 308 stores in its memory a data table that correlates various information, e.g. the frequency of the upstream channel assigned to particular subscriber at a given instant in time, subscriber identification information, service level information, telco line DS0 identifying information (i.e. the identity of the lines in the multiplexed input telephony signal provided from the telephone operating company), signaling status information, error count and threshold information indicative of noise level on a selected channel, and a "noisy channel" flag indicative of whether the noise in a selected channel has exceeded a predetermined threshold and therefore requires a change.

The table of FIG. 15 will be described in connection with examples of varying levels of service that may be elected by a subscriber. It will be recalled that each upstream (128 kHz) channel carries two DS0 signals at 64 kbps each, QPSK modulated. Thus, the first upstream channel UP1 has a nominal carrier center frequency of 5.12 MHz, assuming that the subband for the channel begins exactly at 5.064 MHz and extends to 5.192 MHz. In the first example of a channel UP1, a subscriber identified as S1 has elected a default level of service, indicating one line of voice grade telephony service at 64 kbps. The table indicates that the telephone company (telco) DS0 line is DS0-6, which indicates that line DS0-6 in the input multiplex is the appropriate input/output line carrying communications for this subscriber at this particular instant in time. It will be appreciated that the telco DS0 number can be associated with any particular channel, because of the frequency agility of the reverse channel circuitry described herein.

The status of the line DS0-6 is indicated in FIG. 15 as being "on hook", and therefore inactive. There is also provided an error count and threshold field associated with a channel, which in the example being described is not applicable (N/A) is the channel is inactive. The error threshold is indicated at 256, although this value is selectably variable according to the system operator. Finally, there is provided a "noisy channel" flag, wherein 0 equals OK or acceptable and 1 equals noisy. A "1" set in the noisy channel flag indicates a frequency change for the reverse channel is to be effected, as the noise level has been detected as excessive.

It will be recalled that each channel UPn carries up to two DS0 signals. Accordingly, FIG. 15 shows that the second DS0 capability for the channel UP1 is unused for this example.

As a second example, note the functions associated with the subscriber identified as S2. The subscriber S2 is shown allocated to the first channel frequency 5.248 MHz in UP2, and has elected two voice grade lines, which have been assigned to the telco DS0's DS0-7 and DS0-204. The signaling status field indicates that DS0-7 is "off-hook" and therefore active. Conversely DS0-204 is indicated as on-hook and therefore inactive. For the active line DS0-7, note that an error count of 6 has been stored in the error count field, which is within the acceptable threshold of 256.

Next consider the service level allocated to subscriber S3. Assume for this example that subscriber S3 has elected basic rate ISDN telephony service, which comprises in the conventional configuration two bearer or "B" channels plus one data channel or "D" channel (2B+D). Each "B" channel is at 64 kbps and each "D" channel is 16 kbps, yielding 144 kbps nominally. Those skilled in the art will understand that the primary signal carrying function of ISDN service can be effected with only the two 64 kbps B channels; the D channel is optional for ISDN basic rate equipment and can be carried separately from the B channels. An ISDN 2B+D "S" interface is called a basic rate interface (BRI), and normally utilizes four unshielded normal telephone wires or two twisted pair wires to deliver two B 64 kbps channels and one D channel of 16 kbps. Each of the two 64 kbps B channels can be used to carry a voice conversation, or one high speed data or several data channels which are multiplexed into one 64 kbps high speed data line. The D channel of 16 kbps carries control and signal information to set up and break down voice and data calls.

For the subscriber S3 in FIG. 15, nominal ISDN service requires both DS0's of the channel UP3, which have been assigned to the telco DS0 channels at DS0-12 and DS0-13. To accommodate the D channel of ISDN, a quarter portion (¼) of an additional DS0 channel is required if the D channel is to be transmitted together with the associated B channels. This is shown as assigned to a portion of the upstream channel UP4, assigned to telco DS0-144. All of these channels are shown as active and therefore are accumulating an error count, all of which are below the threshold of 256 and are therefore acceptable.

Next in FIG. 15, consider the service level allocated to subscriber identified as S4. It is assumed in this example that a single subscriber S4 has elected T1 telephony service, which comprises 24 DS0's. These 24 DS0's have been associated with telco channels DS0-155 through DS0-179. It will also be appreciated that to accommodate this many DS0 channels at a CIU equipment, there must be provided a corresponding number of reverse channel modulators, line cards, etc. T1 service is typically associated with commercial use, whereas typical home equipment will only provide for a few DS0 capability.

Next consider the service indicated by the subscriber identified as S5. A particular function that has been previously described is that of security monitoring services, as in the connection of a security alarm network associated with a subscriber's premises to one of the line cards 98' (FIG. 12). Accordingly, the upstream channel UP30 is assigned to the subscriber S5, who has elected a security monitor service level. The signaling status indicates a "normal" status. Therefore, there is no need to allocate a telco DS0 at this particular instant in time, in that there is no need to communicate any particular signals until an alarm condition occurs.

In this regard, consider the subscriber S6, who has also elected security monitoring service level. The signaling status indicates an alarm condition, and a telco line identified as DS0-191 has been assigned to this particular channel for monitoring of any signals that may be provided from the customer's security alarm network. The security monitoring signals are provided upstream to the HIU and thence via the DS0-191 line to a security service (e.g. for dispatch of an armed guard or for remote monitoring of the situation via data communicated through the system). Accordingly, it will be appreciated the bandwidth associated with security monitoring is not necessarily allocated until an alarm condition occurs, and that the bandwidth for upstream communications need only be utilized in response to an alarm condition.

An alarm condition may be indicated in response to interruption of the coaxial cable to a particular subscriber's equipment. It will be recalled from the discussion above that each CIU 400 contains predetermined address information that is transmitted to the HIU on the upstream signaling channel whenever service is requested by a subscriber, or when a channel is active. Likewise, the address information is transmitted downstream in the directory channel so that a CIU can tune to the upstream channel commanded by the HIU or provide a ring signal to a telephone connected to the CIU. The CPU 410 (FIG. 12) in the CIU is operative to monitor the forward directory channel for incoming signals addressed to it, and to provide an upstream communication identifying itself and any relevant signaling information on the assigned upstream channel UPn. Preferably, the address information and signaling information from all CIU's are transmitted upstream to the HIU in response to a command from the HIU to tune to a particular upstream channel frequency and transmit signaling information including address and status. This is in effect a "polling" operation wherein a particular address CIU is responsive to a command or poll from the HIU to respond with a communication in a particular upstream channel. However, if the broadband communication line has been cut or a malfunction occurs, the CIU will not be able to transmit its address and status information to the HIU.

Therefore, in the event that the coaxial cable is cut and the CIU 400 fails to communicate its identity and status information in response to a poll by the HIU, an alarm condition will be indicated and the appropriate status information will be indicated in the signaling status field in FIG. 15. In the preferred embodiment, the alarm condition causes the setting of an alarm status indicator in the service level memory associated with the particular subscriber so that remedial action can be indicated. It is expressly contemplated that the HIU can generate appropriate telephony messages to a security monitoring service so as to alert a security guard service as to the alarm condition.

Before leaving FIG. 15, it will be noted that the service level table comprises an array of data fields, suitable for storage in a database maintained by the HIU's CPU 308. Preferably, this table is maintained in RAM for rapid access. Furthermore, it is preferred that the table be indexed utilizing conventional database indexing methods so that the table may be rapidly search by subscriber name, subscriber address, telco DS0 number, upstream carrier frequency, etc. Use of indexed methodologies ensures rapid lookup of service level and minimized response time when a subscriber requests service.

From the foregoing, it will be understood and appreciated that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. In the preferred embodiment, the bandwidth is selectably allocated in discrete unit of DS0's, which will be understood can be combined to provide for higher capacity digital data channels in response to varying needs of subscribers.

Furthermore, it will be understood that the frequency agile CIU is operative to reassign signals in a selected subband, such as UP1 . . . UPn, to another subband at another frequency in response to a determination that the noise level in a particular selected subband exceeds a predetermined level.

Finally, there is provided at least one upstream signaling channel that is utilized by each connected CIU 400 to provide signaling information such as off hook, alarm conditions, together with address information. Each CIU 400 is normally assigned at least one upstream frequency (either the DS0-1 or the DS0-2 of the 128 kHz channel), which comprises a portion of the 16 kbps data channels that is combined with two 64 kbps data channels to form 144 kbps for each upstream frequency subband. The 16 kbps signaling and status information includes the subscriber's address as well as status information associated with a subscriber's address.

Figure 16:
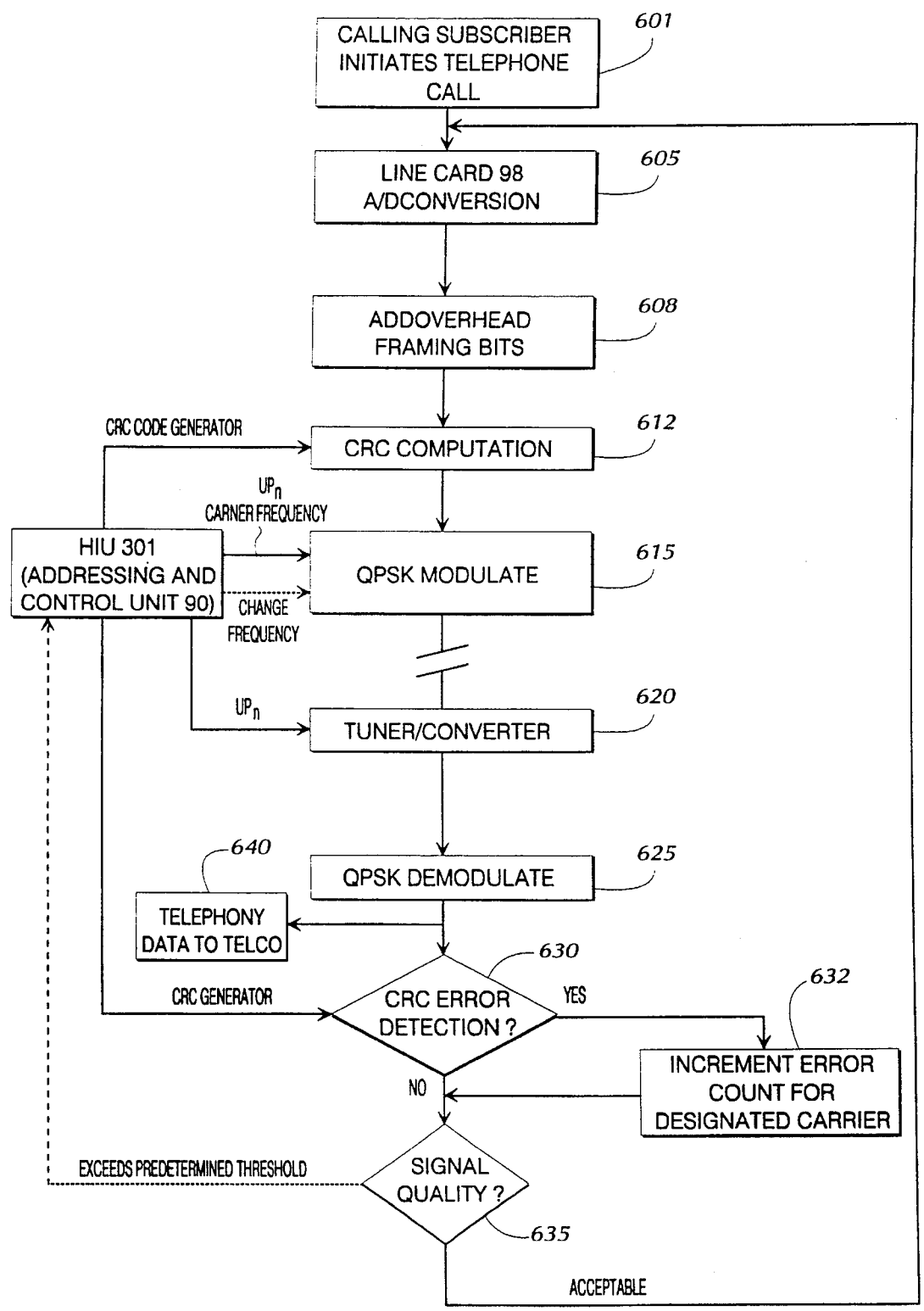
FIG. 16 illustrates the method carried out in the alternative HIU and CIU of FIGS. 11 and 12 for dynamic bandwidth allocation and frequency assignment in the reverse channels.

In this regard, turn next to FIG. 16 for a discussion of the manner in which the present invention operates to monitor noise level and allocate frequencies.

FIG. 16 is a flow chart illustrating a sequence of operations wherein a calling subscriber initiates a communication and a request for telephony, and the equipment responds by allocating bandwidth and designating an upstream channel, broadcasting the identity of a selected channel in a downstream directory channel for receipt by the requesting CIU, measurement of signal quality in the channel, etc.

The process begins in step 601, where a calling subscriber initiates a telephone call by going "off hook" with telephony equipment connected to a line card 98'. Generally, the first step taken is to provide a signal indicative of the changed status of the telephony equipment in the upstream direction to the HIU equipment.

The change in status from "on hook" to "off hook" is communicated in the upstream signaling channel designated for use by the associated CIU. As described in connection with FIG. 17, the changed status data is communicated upstream to the HIU 301 together with the CIU's address; the HIU is responsive to determine if it is appropriate that this particular subscriber remain at the designated upstream channel for communications of the telephony signals. In embodiments that utilize a single signal frequency for signaling channel purposes that is accessed by all CIU's in a TDMA fashion, a channel will be assigned for the voice channel communications and this information will be transmitted downstream in the forward channel.

Assuming that a reverse channel has been assigned, the next step taken at 604 is to begin an analog to digital (A/D) conversion of the telephony signal in the line card 98' associated with the requesting subscriber, utilizing the CODEC 407 to obtain a digital data stream. The digital data stream is combined at steps 608 with framing bits by the CIU's CPU to obtain the frames and superframes as described in connection with FIG. 9C.

At step 612, a CRC computation associated with the subframes and superframes is computed and added in the appropriate fields within the frame and subframe. At step 615, the superframe is provided to the QPSK modulator, where it is transmitted on the broadband network upstream on the designated subband for upstream communications.

At the HIU 301, which corresponds to the addressing and control unit 90 in other embodiments, the particular upstream carrier frequency that was assigned for upstream communication is also provided to a selected reverse channel demodulator converter 114' as has been described in connection with FIG. 14. The converter 114' at step 620 then tunes to the designated upstream channel UPn. At step 625, the QPSK demodulator then demodulates the signal into the 144 kbps data stream. The data stream is formed into the superframe by examining the framing bits for delimiting the superframe.

In step 630, the CRC values associated with the superframe are examined, and if the CRC is incorrect, the error count shown in FIG. 15 associated with a designated upstream channel is incremented. In the event that the error count exceeds the predetermined threshold within a predetermined time period, as measured by the HIU computer, it is deemed that the channel is excessively noisy. This is shown at step 632. At step 635, the error count is compared on a periodic basis to the predetermined error count threshold to determine if the noise exceeds acceptable levels. At step 635, so long as the signal quality is acceptable, there is no need to change frequencies for upstream communications. On the other hand, in response to a determination that the error count exceeds the predetermined threshold from step 635, the HIU 301 is operative to change the carrier frequency.

If the signal quality at step 635 is acceptable, the method returns to step 605 and continues to transmit telephony data in the manner described.

In the event of a detection of an error, the data is not retransmitted from the CIU to the HIU. Rather, the data is demodulated and provided at step 640 to the telco line associated with a particular subscriber for communications on the telephony network.

Figure 17:
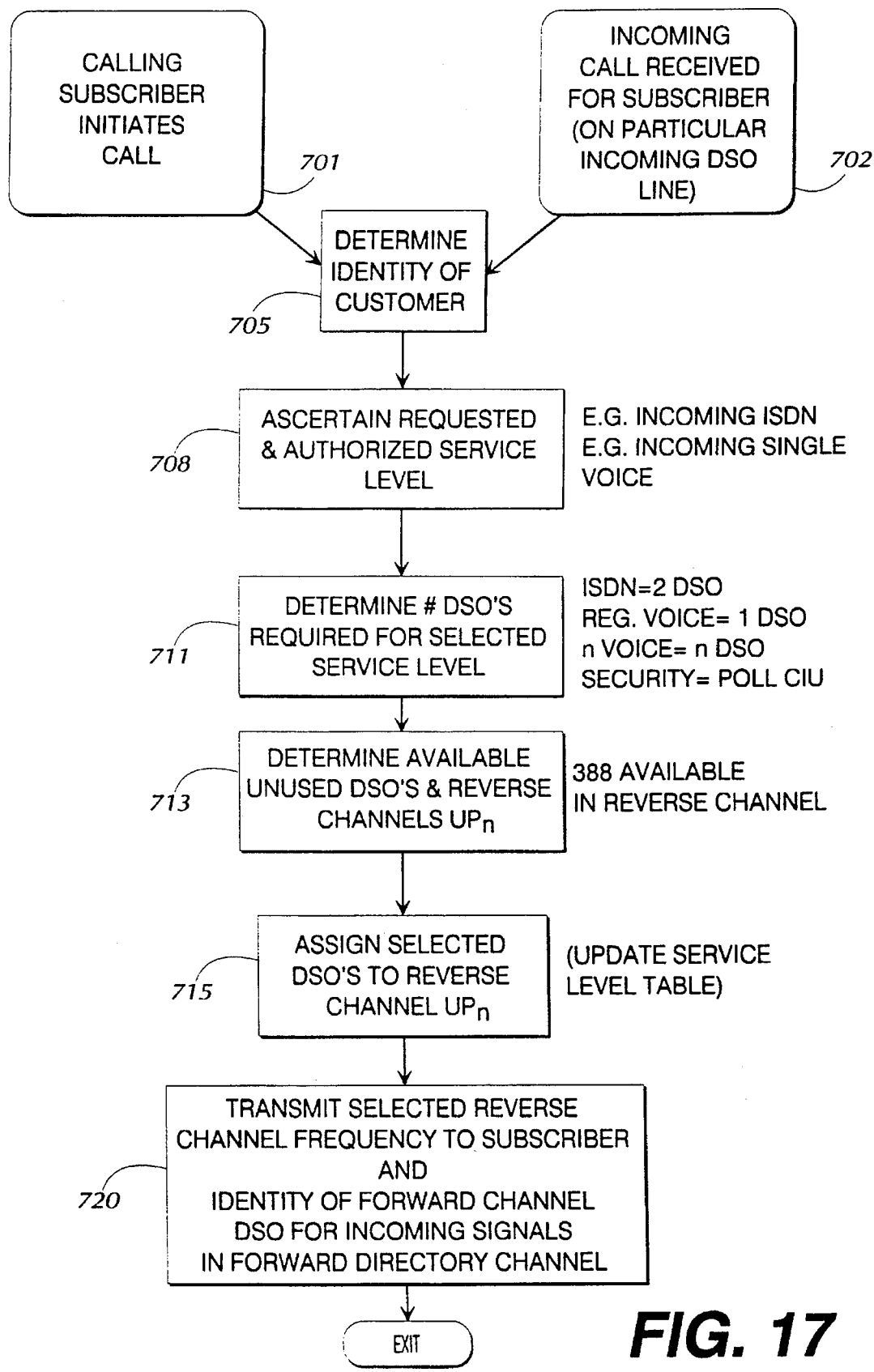
FIG. 17 illustrates the method carried out in the alternative HIU and CIU of FIGS. 11 and 12 for handling a communication for a caller.

FIG. 17 illustrates the preferred method of dynamic bandwidth allocation in response to selected levels of service requested by subscribers. There are two pathways for invoking the method involved with dynamic bandwidth allocation on behalf of a customer: (1) when a calling subscriber initiates a request for telephony service originating at CIU, and (2) when an incoming call is received for a subscriber on a particular incoming telco DS0 line from the telephony network. Both pathways require that the system determine the appropriate level of service, and commensurate bandwidth, for the call. These steps are shown at 701 and 702, respectively. It will be appreciated that the remaining steps are substantially the same regardless of whether the subscriber initiates a call or an incoming call is received for the subscriber.

In a case where the calling subscriber initiates the call at step 701, the procedures described in connection with FIG. 17 of providing the "off hook" status information is provided in the designated upstream channel to the HIU 301, so that an appropriate upstream channel can be assigned, if one is not assigned by default.

Next referring to step 705, in response to receipt of the status information indicating a request for service (such as an "off hook" status), or receipt of an incoming call at the HIU, the identity of the customer is ascertained by inspecting the service level table maintained in memory by the HIU 301.

At step 708, the requested and authorized service level for the identified customer is ascertained. This entails determining, for example, that the subscriber has requested service such as ISDN and is authorized to receive ISDN service, or other similar service levels such as single line voice, multiple line voice, data communications, security services, etc.

At step 711, after the appropriate authorized and requested service level has been ascertained for the particular subscriber, the number of DS0's required for the selected service level are determined. For example, ISDN requires at least two DS0's (and possibly more if 2B+D service is provided), a single regular voice channel requires one DS0, plural voice channels require plural DS0's, security requires periodic monitoring of the CIU, etc.

At step 713, the selected number of required DS0 data channels is determined, by using an index to the service table that is sorted numerically by telco DS0 number, to determine which DS0's are unused and may be selected and assigned for use to satisfy the service request. Likewise, a corresponding number of reverse channels UPn are determined for the selected service level. It will be recalled that in the disclosed embodiment, there are 388 available DS0 data channels in the reverse spectrum.

At step 715, the selected one or more DS0's in the reverse channel are associated with particular DS0 channels from the telephony network, or in the case of an incoming call, the particular incoming DS0 line from the telephony network is associated with the selected one or more DS0's in the reverse channel. The selected DS0's are then assigned to one or more corresponding reverse channel frequencies UPn. In this regard, the service level table of FIG. 15 is updated to reflect the correspondence between telephone DS0 channel numbers and reverse channel frequencies in the upstream spectrum. This is carried out by inspecting the service level table to determine available reverse channels.

Finally, at step 720, selected reverse channel frequencies are transmitted to the particular subscriber in the forward directory channel, by transmitting the CIU address and upstream channel identification. The identity of the forward channel DS0 is also identified in the service level table for incoming signals in the forward directory channel so that incoming signals from the telephony network can be routed to an appropriate forward channel frequency and DS0 channel for provision to the subscriber CIU, which monitors the appropriate DS0 channel in the forward spectrum. In this manner, it will be understood and appreciated that bandwidth may be allocated in a selectably variable manner so as to provide for appropriate levels of service that have been selected by a customer.

Referring now to FIGS. 9B and 9C, the data framing or data format for the reverse path and forward path digital data as utilized in an alternative embodiment of the invention will be described. In FIG. 9B, the reverse path data format, which is transmitted upstream in QPSK modulation, comprises four subframes of 27 bytes to form a single superframe. Each subframe is identical and includes a framing byte (FB) of eight bits, two data link (DL) bytes each containing eight signaling bits, and twenty-four DS0 data bytes (192 bits). The DS0 data bytes portion is formed by the multiplexing of the two DS0s.

A superframe is comprised of four subframes, and a CRC is computed over the superframe block. The framing byte of each subframe comprises seven bits of synchronization and one bit CRC. There are thus four bits of CRC transmitted with each superframe, which comprises the CRC remainder associated with the immediately preceding superframe.

The DL bytes of each subframe are used to carry messages that indicate required telephony signaling such as on hook and off hook in the upstream direction. In the preferred alternative embodiment, the association between a subscriber's CIU and the signaling is effected by the HIU addressing and control unit 42 (FIG. 4) or HIU 301 (FIG. 11). The association between a subscriber's CIU and an on hook or off hook signal is preferably determined by the predetermined association of a particular reverse channel frequency with a particular CIU address, which is maintained in the service level table maintained by the HIU. Alternatively, the association could be made by providing address information in the DL bytes that indicate which particular subscriber's equipment is indicating the particular signaling.

For noise monitoring purposes, each subframe includes a CRC bit as a part of the framing byte (FB), and each of the subframes also include a CRC bit indicative of the CRC calculation for the entire superframe. As described elsewhere in connection with the alternative embodiment herein, an incorrect CRC calculation on a received superframe is indicative of noise in the channel and an excessive number of such CRC errors exceeding a predetermined threshold causes the carrier frequency to be changed in accordance with the alternative embodiment.

FIG. 9C illustrates the data format or framing in the forward path, which is transmitted downstream in QPR modulation. As in the preferred embodiment, the framing is organized as even and odd subframes of 99 bytes. The subframes are grouped into multiples of eight in a multiframe or superframe to allow for CRC computation. In contrast to FIG. 9A, the data format for the forward path in the alternative embodiment includes a 1 byte allocation for a directory channel (DIR), 1 byte for a signaling channel (SIG), and 96 bytes allocated to the telephony data, comprising 96 DS0's for each carrier. It will be observed that the directory channel (DIR) and signaling channel (SIG) are included in each subframe in the forward path. The DIR and SIG channels are therefore continuously broadcast to all forward path demodulators associated with the CIU's so that each CIU can continuously monitor the directory channel and respond rapidly to a command to change frequencies in the reverse spectrum, if necessary, and to respond very quickly to signaling the information provided to a particular CIU, e.g., a ringing condition for a selected subscriber telephone. In order to accommodate the directory channel (DIR), there is provided up to 480 address words followed by indicia indicative of a selected channel that a particular addressed CIU is to utilize for its reverse channel communications, together with appropriate signaling status information associated with the addressed information.

While there has been shown and described the preferred embodiments of the invention, it will be evident to those skilled in the art that various modifications and changes may be made thereto without departing from the spirit and scope of the invention as set forth in the appended claims and equivalents thereof.

What is claimed is:

1. A bidirectional signal communications system for receiving a multiplexed input signal comprising a plurality of input data channels and for providing a multiplexed output signal comprising a plurality of output data channels, wherein each input data channel in the multiplexed input data signal corresponds to a particular one of a plurality of destinations connected via a broadband communications medium and wherein each output data channel corresponds to a particular one of a plurality of origins connected via said broadband communications medium, said system comprising:

a first converter for converting data in said input data channels into modulated downstream carriers in downstream channels associated with particular destinations;

a first transmitter for transmitting said modulated downstream carriers to said plurality of said destinations;

at least one demodulator for demodulating an assigned carrier of said modulated downstream carriers at a destination and recovering incoming data in a particular data channel associated with said particular one of said destinations;

at least one modulator for modulating outgoing data from said particular one of stud plurality of origins on an assigned carrier for one of a plurality of upstream channels;

at least one second transmitter for transmitting said modulated assigned carrier from said particular one of said origins;

a second converter for converting said assigned carriers in said upstream channels into said output data channels for said multiplexed output signal, a noise monitor for monitoring the noise level in a particular upstream channel, and equipment for reassigning outgoing data to a carrier at a different frequency in a different upstream channel in response to noise level exceeding a predetermined level in said particular upstream channel.

2. A bidirectional communications system as set forth in claim 1 wherein:

said multiplexed input signal is a standard digital telephony signal.

3. A bidirectional communications system as set forth in claim 2 wherein:

said standard digital telephony signal includes at least one of the group of a DS-0 format signal, a DS-1 format signal, a DS-2 format signal, and a DS-3 format signal.

4. A bidirectional communications system as set forth in claim 1, wherein:

said multiplexed output signal is a standard digital telephony signal.

5. A bidirectional communications system as set forth in claim 4, wherein:

said standard digital telephony signal includes at least one of the group of a DS-0 format signal, a DS-1 format signal, a DS-2 format signal, and a DS-3 format signal.

6. A bidirectional communications system as set forth in claim 1 wherein:

said central point is the headend of a CATV network; and said origins and destinations of data are subscribers of said CATV network.

7. A bidirectional communications system as set forth in claim 1, wherein:

said origins and destinations of data are subscribers in a tree-type network extending from said central point.

8. A bidirectional communications system as set forth in claim 7, further comprising:

equipment operative for associating at least one upstream channel with a particular subscriber's telephony equipment; and equipment for associating at least one downstream channel with said telephony equipment.

9. A bidirectional communications system as set forth in claim 7, further comprising a customer interface unit (CIU) defining a destination for incoming data and an origin for outgoing data, said CIU including said at least one demodulator, said at least one modulator, and said at least one second transmitter.

10. A bidirectional communications system as set forth in claim 1, further comprising:

equipment for associating a plurality of upstream channels and a plurality of downstream channels to a single subscriber to provide for selectably variable bandwidth service.

11. A bidirectional communications system as set forth in claim 10, wherein said selectably variable bandwidth service comprises telephony service selected from single line service, multiple line service, ISDN service, and T1 service.

12. An apparatus for the communication of telephony signals to and from a telephony network and to and from a plurality of subscribers of a subscription system including a subscription network having a first band of frequencies for communicating signals to subscribers in the subscription network and a second band of frequencies for communicating signals from the subscribers, comprising:

a telephony network modulator for modulating the telephony signals from the telephony network on said first band of said subscription network utilizing a first modulation scheme;

a subscriber terminal including a subscriber terminal demodulator for demodulating the telephony signals in said first band from the subscription network and coupling them to a subscriber;

at least one frequency agile second modulator for modulating telephony signals from said subscriber in a selected one of a plurality of frequency subbands in said second band of the subscription network utilizing a second modulation scheme; and a telephony network demodulator for demodulating the telephony signals from said second band of the subscription network and coupling them to the telephony network.

13. The apparatus of claim 12, wherein a plurality of said frequency agile second modulators is operative for modulating telephony signals from the subscriber in a plurality of frequency subbands in said second band of the subscription network so as to provide selectably variable bandwidth in said second band commensurate with a selected subscriber communication feature.

14. The apparatus of claim 13, wherein said selected subscriber communication feature comprises voice grade telephone service.

15. The apparatus of claim 13, wherein said selected subscriber communication feature comprises ISDN telephone service.

16. The apparatus of claim 13, wherein said selected subscriber communication feature comprises plural voice grade telephone service.

17. The apparatus of claim 13, wherein said selectably variable bandwidth comprises at least one subband provided in said second band of said subscription network.

18. The apparatus of claim 17, wherein said subband is 128 kHz.

19. The apparatus of claim 17, wherein said selectably variable bandwidth comprises a plurality of non contiguous 128 kHz subbands.

20. The apparatus of claim 17, further comprising:

a noise monitor for monitoring the noise level in a selected subband in said second band associated with a selected subscriber, and wherein said frequency agile second modulator is operative to reassign signals in said selected subband to another subband at another frequency in response to a determination by said noise monitor that the noise level in said selected subband exceeds a predetermined level.

21. The apparatus of claim 12, wherein said first modulation scheme is QPR, and said second modulation scheme is QPSK.

22. The apparatus of claim 12, further comprising an address and control unit (ACU) for associating frequency subbands in said second band of the subscription network with subscribers.

23. The apparatus of claim 22, wherein said ACU maintains an allocation table in memory storing information in association selected from the group comprising: subscriber identification, frequency subband, noise level, service level, security status, and line status.

24. The apparatus of claim 12, further comprising:

a broadcast message information source for generating a telephony message for broadcast to a selected group of subscribers on the subscription network; and a device for coupling said broadcast message to a carrier in the forward band of the subscription network for communication to said selected group of subscribers, whereby a telephony message is generated at a single source and delivered to plural subscribers.

25. The apparatus of claim 12, wherein said first modulation scheme is QPR, and said second modulation scheme is QPSK.

26. The apparatus of claim 12, further comprising an address and control unit (ACU) for associating frequency subbands in said second band of the subscription network with subscribers.

27. A method of operating a communication system to couple telephony signals to and from a telephony network and to and from a plurality of subscribers of a subscription system including a tree-and-branch type broadband subscription network extending from a headend to the subscribers, comprising the steps of:

providing a telephony network interface for telephony signals from the telephony network to the headend;

providing an interface for telephony signals from a subscriber to a subscriber terminal connected to the subscription network;

providing a first band of frequencies for communicating signals to subscribers from the headend;

modulating the telephony signals from the telephony network on the first band of the subscription network utilizing a first modulation scheme;

providing a second band of frequencies for communicating signals to the headend from subscribers;

subdividing the second band of frequencies into a plurality of selectable subbands;

in response to a request for telephony service with a subscriber, selectably allocating a particular one of the selectable subbands in the second band of frequencies to the subscriber; and modulating telephony signals from the subscriber in the particular subband utilizing a second modulation scheme to transmit said telephony signals from the subscriber to said telephony network interface.

28. The method of claim 27, wherein the second modulation scheme comprises a modulation scheme that is relatively noise-resistant in the upstream direction in the tree-and-branch network structure.

29. The method of claim 28, wherein the second modulation scheme is quadrature phase shift keying (QPSK).

30. The method of claim 27, further comprising the step of allocating one or more selected frequency subbands in the second band of the subscription network so as to provide selectably variable bandwidth commensurate with a selected subscriber communication feature.

31. The method of claim 27, wherein the request for telephony service originates at a subscriber having a default level of telephony service.

32. The method of claim 31, wherein the default level of telephone service is DS0 (64 kbps).

33. The method of claim 27, wherein the request for telephony service originates at a subscriber having selected one of a plurality of selectable levels of communications service available to the subscriber.

34. The method of claim 33, wherein each of the plurality of selectable levels of communications services requires a predetermined data communications bandwidth, and further comprising the step of selecting a plurality of frequency subbands in the second band of the subscription network.

35. The method of claim 34, wherein the request for telephone service originating at a subscriber comprises a request selected from: single line telephony service, multiple line telephony service, ISDN telephony service, data communications service, videoconferencing service, interactive television service, video game service, security monitoring service.

36. The method of claim 33, further comprising the steps of:

communicating a request for a selected service level to the headend;

determining identity of the subscriber requesting the selected service level:

verifying that the subscriber is authorized to receive the requested service level;

in response to verification that the subscriber is authorized to receive the requested service level, allocating one or more selected frequency subbands in the second band of the subscription network so as to provide selectably variable bandwidth commensurate with selected service level;

communicating the identify of the one or more selected frequency subbands to the subscriber; and receiving signals from the subscriber in the one or more selected frequency subband from the subscriber at the headend.

37. The method of claim 27, wherein the request for telephony service originates at the headend in response to an incoming communication directed to a subscriber, and further comprising the steps:

determining identity of the particular subscriber to receive the incoming communication;

determining an appropriate service level to provide the communication to the particular subscriber;

allocating one or more selected frequency subbands in the second band of the subscription network so as to provide selectably variable bandwidth commensurate with determined appropriate service level;

communicating the identity of the one or more selected frequency subbands to the particular subscriber;

communicating the incoming communication to the particular subscriber in the first band of frequencies;

at the subscriber terminal associated with the particular subscriber, receiving the identity of the one or more selected frequency subbands for communications back to the headend; and communicating subscriber signals to the headend in the one or more selected frequency subbands.

38. The method of claim 37, further comprising the steps:

receiving signals at the headend from the particular subscriber in the one or more selected frequency subbands;

demodulating the signals to obtain standard telephony signals;

routing the standard telephony signals from the particular subscriber to a communications port associated with the incoming communication directed to the particular subscriber.

39. The method of claim 38, further comprising the steps:

multiplexing a plurality of standard telephony signals obtained from a plurality of subscribers into a standard multiplexer telephony signal.

40. The method of claim 39, wherein the standard telephony signal is a DS0 format, and wherein the standard multiplexed telephony signals are selected from formats DS1, DS2, DS3, E1, T1, and SONET.

41. A method of operating a bidirectional communication system to couple telephony signals to and from a telephony network and to and from a plurality of subscribers of a subscription system including a broadband subscription network extending from a headend to the subscribers, each subscriber having a subscriber terminal, comprising the steps of:

receiving a multiplexed telephony signal containing a plurality of predetermined telephony signals in a plurality of telephony channels;

demultiplexing the multiplexed telephony signal to obtain a particular telephony signal from a particular telephony channel;

communicating the particular telephony signal from the headend to a particular subscriber at a subscriber destination associated with the particular subscriber in a first frequency band in the subscription system;

selecting a particular subband in a second frequency band in the subscription system to receive subscriber telephony signals from the particular subscriber;

communicating the identity of the selected particular subband in the second frequency band to the particular subscriber from the headend so as to cause a subscriber terminal to transmit the subscriber's telephony signals in the selected subband:

communicating subscriber telephony signals from the particular subscriber at the subscriber destination to the headend in the selected particular subband; and coupling the subscriber telephony signals to the particular telephony channel.

42. The method of claim 41, wherein the multiplexed telephony signal comprises a SONET signal.

43. The method of claim 41, wherein the multiplexed telephony signal is communicated via an optical fiber link from a telephony central office to the headend.

44. The method of claim 41, wherein the multiplexed telephony signal is communicated from a telephony central office to the headend, and thence via an optical fiber link from the headend to a fiber node.

45. The method of claim 41, wherein the step of communicating the identity of the selected particular subband in the second frequency band to the particular subscriber comprises the step of providing a signaling channel for communication of status signals between a subscriber and the headend.

46. The method of claim 41, further comprising the step of changing the frequency from the selected subband in the second frequency band to another frequency subband during a communication session involving the particular subscriber.

47. The method of claim 46, further comprising the step of monitoring the noise level in the selected subband, and wherein the step of changing the frequency of the selected subband is carried out in response to a determination in the monitoring step that the noise level in the selected subband exceeds a predetermined threshold.

48. The method of claim 47, wherein the subscriber telephony signals are digital signals transmitted in a plurality of packets of digital data, and wherein the step of monitoring the noise level in the selected subband comprises the steps:

determining a cyclic redundancy check (CRC) value for each packet of digital data comprising the subscriber telephony signal prior to transmission of the signal;

receiving the CRC value at the headend;

in response to a determination that the CRC value is incorrect, incrementing an error count register;

comparing the error count register to a predetermined value;

when the error count register exceeds a predetermined threshold value, setting a noisy channel status flag; and changing the frequency in response to setting the noisy channel status flag.

49. The method of claim 48, wherein the step of comparing the error count register to the predetermined threshold value is carried out on a periodic basis so as to determine the number of transmission errors associated with a predetermined number of packets transmitted in a predetermined time.

50. A telephony system for communicating telephony signals between a telephony network and a broadband communication network including a headend communicating to a plurality of subscribers, comprising:

a modulator, coupled between the telephony network and the headend, for modulating the telephony signals from the telephony network on a carrier in a first band of the broadband communication network;

equipment for determining a selected service level for a particular subscriber and for communicating information for effecting the selected service level indicating one or more selected frequency subbands in a second band of the broadband communication network to the particular selected subscriber; and a demodulator, coupled between the telephony network and the headend, for demodulating the telephony signals from the particular subscriber in the one or more selected frequency subbands and coupling them to the telephony network.

51. The system of claim 50, wherein the broadband communication network includes a subscriber terminal for demodulating the telephony signals in the first band of broadband network and coupling them to the subscriber, and for modulating the telephony signals from the subscriber in the one or more selected frequency subbands in the second band of the broadband network for communication to the headend.

52. The system of claim 51, wherein the subscriber terminal includes a frequency agile modulator for modulating the telephony signals in the one or more selected frequency subband in the second band, and further comprising:

a noise monitor for monitoring the noise level in a selected frequency subband associated with a particular subscriber, and equipment responsive to the noise monitor for communicating a frequency change signal to a particular subscriber when the noise level in the selected frequency subband exceeds a predetermined threshold, whereby the subscriber terminal changes the frequency for communicating at least some of the telephony signals to a different selected frequency subband when a given channel becomes too noisy.

53. The system of claim 50, wherein the broadband communication network is a cable television (CATV) network, and further comprising equipment for providing television program signals in said first band of frequencies to subscribers.

54. The system of claim 50, wherein the equipment for determining the selected service level comprises:

equipment for communicating in the first band a directory message in a directory channel containing subscriber identification information and the identity of one or more selected frequency subbands in the second band associated with the subscriber identification information.

55. The system of claim 50, wherein the information for effecting the selected service level comprises a message including address information corresponding to a selected subscriber and frequency subband information corresponding to the one or more selected frequency subbands.

56. The system of claim 55, wherein said channel assignment message is transmitted in a directory channel.

57. The system of claim 50, further comprising:

a frequency agile modulator located at the subscriber operative to change the frequency at which telephony signals are being communicated to the headend from a first frequency subband to a second frequency subband in response to a command received from the headend.

58. The system of claim 57, wherein the frequency agile modulator comprises a quadrature phase shift keying (QPSK) modulator operative at selectable carrier frequencies varying in discrete increments of 128 kHz channels, beginning at a nominal initial carrier frequency of 5.12 MHz, with a nominal data rate of 144 kbps per channel.

59. The system of claim 58, wherein each said 144 kbps channel comprises two 64 kbps DS0 telephony () channels and one 16 kbps overhead channel including data headers, address information, and CRC data.

60. The system of claim 58, wherein each 128 kHz channel comprises a 108 kHz bandwidth data channel and 20 kHz in guard bands.

61. The system of claim 50, wherein telephony signals from the headend communicated to the subscriber are transmitted in said first frequency band as downstream signals, and further comprising:

a customer interface unit including a demodulator for demodulating said downstream signals in the first frequency band to obtain an incoming telephony signal and coupling said incoming telephony signal to a telephony port.

62. The system of claim 61, wherein said downstream signals are communicated to the customer interface unit via QPR modulation.

63. The system of claim 61, wherein said downstream signals communicated in the first frequency band comprise:

a plurality of incoming telephony signals arranged in a plurality of channels;

at least one directory channel containing said second signals; and at least one signaling channel containing status information.

64. The system of claim 63, wherein the downstream signals comprise a 3.168 MHz QPR modulated signaling containing 96 DS0 digital incoming telephony signals, said directory channel, said signaling channel, and CRC data associated with a frame of digital signals.

65. A customer interface unit for connection to a broadband communication network, the customer interface unit operative for receiving first signals in a first frequency band from a headend associated with the broadband communication network, for receiving second signals from the headend, and for communicating telephony signals between a subscriber and the headend, said customer interface unit comprising:

a first demodulator for demodulating first signals in the first frequency band and for coupling them to an output port of the customer interface unit;

a second demodulator for receiving second signals and for identifying, from said second signals, one of a plurality of frequency subbands in a second band of frequencies in the broadband communication network for communicating telephony signals to the headend; and a frequency agile modulator responsive to the identified one of said plurality of frequency subbands in the second band of frequencies for modulating the telephony signals from the customer interface unit in the identified frequency subband.

66. The customer interface unit of claim 65, wherein the broadband communication network is a cable television (CATV) network.

67. The customer interface unit of claim 66, wherein said first signals comprise television program signals, and wherein said output port comprises a video signal port for connection to a CATV set top converter.

68. The customer interface unit of claim 65, wherein said output port comprises a telephony port for receiving the telephony signals into the customer interface unit.

69. The customer interface unit claim 65, wherein said output port comprises:

a video signal output port for coupling to a cable television set top terminal; and at least one telephony signal port for coupling to a subscriber's home telephony network.

70. The customer interface unit of claim 69, further comprising:

a subscriber input port for receiving subscriber signals associated with an interactive consumer device selected from: pay per view television, interactive television, video games, and shopping channel television selection.

71. The customer interface unit of claim 65, wherein the second signals are communicated in the first frequency band.

72. The customer interface unit of claim 65, wherein the second signals comprise a message including address information corresponding to a selected subscriber and frequency subband information corresponding to the one or more selected frequency subbands.

73. The customer interface unit of claim 65, wherein said second signals are transmitted in a directory channel.

74. The customer interface unit of claim 65, wherein said frequency agile modulator is operative to change the frequency at which telephony signals are being communicated to the headend from a first frequency subband to a second frequency subband in response to a command received as the second signal.

75. The customer interface unit of claim 65, wherein said frequency agile modulator comprises a quadrature phase shift keying (QPSK) modulator operative at selectable carrier frequencies varying in discrete increments of 128 kHz channels, beginning at a nominal initial carrier frequency of 5.12 MHz, with a nominal data rate of 144 kbps per channel.

76. The customer interface unit of claim 75, wherein each said 144 kbps channel comprises two 64 kbps DS0 telephony channels and one 16 kbps overhead channel including data headers, address information, and CRC data.

77. The customer interface unit of claim 75, wherein each 128 kHz channel comprises a 108 kHz bandwidth data channel and 20 kHz in guard bands.

78. The customer interface unit of claim 65, wherein telephony signals from the headend communicated to the subscriber are also transmitted in said first frequency band as downstream signals, wherein said customer interface unit further comprises:

a third demodulator for demodulating said downstream signals in the first frequency band to obtain an incoming telephony signal and coupling said incoming telephony signal to a telephony port.

79. The customer interface unit of claim 78, wherein said downstream signals are communicated to the customer interface unit via QPR modulation.

80. The customer interface unit of claim 78, wherein said downstream signals communicated in the first frequency band comprise:

a plurality of incoming telephony signals arranged in a plurality of channels;

at least one directory channel containing said second signals; and at least one signaling channel containing status information.

81. The customer interface unit of claim 80, wherein the downstream signals comprise a 3.168 MHz QPR modulated signaling containing 96 DS0 digital incoming telephony signals, said directory channel, said signaling channel, and CRC data associated with a frame of digital signals.

82. A method of operating a broadband communication network, including a telephony network interface for connection to a telephony network, for communicating signals between subscribers and the telephony network, comprising the steps of:

receiving a multiplexed incoming telephony signal from the telephony network comprising a plurality of telephony signals provided in a standard multiplexed telephony format;

demultiplexing the incoming multiplexed telephony signal to obtain at least one selected incoming telephony signal intended for a particular subscriber on the broadband communication network;

transmitting the selected incoming telephony signal to the particular subscriber in a first frequency band on the broadband communication network utilizing a first modulation scheme;

receiving the selected incoming telephony signal at a customer interface unit connected to the broadband communication network associated with the particular subscriber;

coupling the selected incoming telephony signal transmitted via the first modulation scheme to a telephony port associated with the customer interface unit;

receiving outgoing telephony signals from a subscriber at the telephony port;

transmitting the outgoing telephony signals on at least one assigned carrier in a selected subband in a second frequency band on the broadband communication network utilizing a second modulation scheme;

demodulating the outgoing telephony signals transmitted via the second modulation scheme in the selected subband to obtain an outgoing telephony signal associated with the particular subscriber;

multiplexing the outgoing telephony signal from the particular subscriber with other telephony signals associated with other subscribers to obtain a multiplexed outgoing telephony signal comprising a plurality of telephony signals in a standard multiplexed telephony format to telephony network; and coupling the multiplexed outgoing telephony signal to the telephony network.

83. The method of claim 82, wherein the second modulation scheme is quadrature phase shift keying (QPSK).

84. The method of claim 82, further comprising the step of:

allocating one or more selected frequency subbands in the second frequency band on the broadband communication network so as to provide selectably variable bandwidth service.

85. The method of claim 84, wherein said selectably variable bandwidth service comprises telephony service selected from a single line service, multiple line service, ISDN service and T1 service.

86. The method of claim 82, wherein the multiplexed incoming telephony signal comprises a SONET signal.

87. The method of claim 82, wherein the multiplexed incoming telephony signal is communicated via an optical fiber link from a telephony central office to a headend of the broadband communication network.

88. The method of claim 82, wherein the multiplexed incoming signal is communicated from a telephony central office to a headend of the broadband communication network, and thereafter is communicated via an optical fiber link from the headend to a fiber node.

89. The method of claim 82, wherein the multiplexed outgoing telephony signal is communicated via an optical fiber link from a headend of the broadband communications network to a telephony central office.

90. The method of claim 82, wherein the multiplexed outgoing signal is communicated via an optical fiber link from a fiber node to a headend of the broadband communication network, and thereafter is communicated from the headend to a telephony central office.

91. The method of claim 82, further comprising the step of:

changing the frequency from the selected subband in the second frequency band on the broadband communication network to another frequency subband during a communication session.

92. The method of claim 91, further comprising the step of:

monitoring the noise level in the selected subband, and wherein said step of changing the frequency of the selected subband is carried out in response to a determination in said monitoring step that the noise level in the selected subband exceeds a predetermined threshold.

93. The method of claim 92, wherein said step of monitoring the noise level in the selected subband comprises the steps of:

determining a cyclic redundancy check (CRC) value for each packet of digital data comprising the telephony signal prior to transmission of the signal;

receiving the CRC value at the headend;

in response to a determination that the CRC value is incorrect, incrementing an error count register;

comparing the error count register to a predetermined value;

when the error count register exceeds a predetermined threshold value, setting a noisy channel status flag; and changing the frequency in response to setting the noisy channel status flag.

94. The method of claim 93, wherein the step of comparing the error count register to the predetermined threshold value is carried out on a periodic basis so as to determine the number of transmission errors associated with a predetermined number of packets transmitted in a predetermined time.

95. A method of operating a bidirectional communication system to couple telephony signals to and from a telephony network and to and from a plurality of subscribers of a subscription system including a broadband subscription network extending from a headend to the subscribers, comprising the steps of:

receiving a multiplexed telephony signal containing a plurality of predetermined telephony signals in a plurality of telephony channels;

demultiplexing the multiplexed telephony signal to obtain a particular telephony signal from a particular telephony channel;

communicating the particular telephony signal from the headend to a particular subscriber at a subscriber destination associated with the particular subscriber in a first frequency band in the subscription system;

selecting a particular subband in a second frequency band in the subscription system to receive subscriber telephony signals from the particular subscriber;

communicating subscriber telephony signals from the particular subscriber at the subscriber destination to the headend in the selected particular subband; and coupling the subscriber telephony signals to the particular telephony channel; and changing the frequency from the selected subband in the second frequency band to another frequency subband during a communication session involving the particular subscriber.

96. The method of claim 95, further comprising the step of communicating the identity of the selected subband in the second frequency band to the particular subscriber from the headend so as to cause the subscriber terminal to transmit the subscriber's telephony signals in the selected subband.

97. The method of claim 96, wherein the step of communicating the identity of the selected subband in the second frequency band to the particular subscriber comprises the step of providing a signaling channel for communication of status signals between a subscriber and the headend.

98. The method of claim 95, further comprising the step of monitoring the noise level in the selected subband, and wherein the step of changing the frequency of the selected subband is carried out in response to a determination in the monitoring step that the noise level in the selected subband exceeds a predetermined threshold.

99. An apparatus for the communication of telephony signals to and from a telephony network and to and from a plurality of subscribers of a subscription system including a subscription network having a first band of frequencies for communicating signals to subscribers in the subscription network and a second band of frequencies for communicating signals from the subscribers, comprising:

a telephony network modulator for modulating the telephony signals from the telephony network on said first band of said subscription network utilizing a first modulation scheme;

a subscriber terminal including a subscriber terminal demodulator for demodulating the telephony signals in said first band from the subscription network and coupling them to a subscriber;

a plurality of frequency agile second modulators for modulating telephony signals from said subscriber in a plurality of frequency subbands in said second band of the subscription network utilizing a second modulation scheme so as to provide selectably variable bandwidth in said second band commensurate with a selected subscriber communication feature; and a telephony network demodulator for demodulating the telephony signals from said second band of the subscription network and coupling them to the telephony network.

100. The apparatus of claim 99, wherein said selected subscriber communication feature comprises voice grade telephone service.

101. The apparatus of claim 99, wherein said selected subscriber communication feature comprises ISDN telephone service.

102. The apparatus of claim 99, wherein said selected subscriber communication feature comprises plural voice grade telephone service.

103. The apparatus of claim 99, wherein said selectably variable bandwidth comprises at least one subband provided in said second band of said subscription network.

104. The apparatus of claim 103, wherein said selectably variable bandwidth comprises a plurality of non contiguous subbands.

105. The apparatus of claim 103, further comprising:

a noise monitor for monitoring the noise level in a selected subband in said second band associated with a selected subscriber, and wherein said frequency agile second modulators are operative to reassign signals in said selected subband to another subband at another frequency in response to a determination by said noise monitor that the noise level in said selected subband exceeds a predetermined level.

106. An apparatus for the communication of telephony signals to and from a telephony network and to and from a plurality of subscribers of a subscription system including a subscription network having a first band of frequencies for communicating signals to subscribers in the subscription network and a second band of frequencies for communicating signals from the subscribers, comprising:

a telephony network modulator for modulating the telephony signals from the telephony network on said first band of said subscription network utilizing a first modulation scheme;

a subscriber terminal including a subscriber terminal demodulator for demodulating the telephony signals in said first band from the subscription network and coupling them to a subscriber;

at least one frequency agile second modulator for modulating telephony signals from said subscriber in a selected one of a plurality of frequency subbands in said second band of the subscription network utilizing a second modulation scheme;

a telephony network demodulator for demodulating the telephony signals from said second band of the subscription network and coupling them to the telephony network; and an address and control unit (ACU) for associating frequency subbands in said second band of the subscription network with subscribers, said ACU maintaining an allocation table in a memory storing information in association selected from the group comprising: subscriber identification, frequency subband, noise level, service level, security status, and line status.

107. The apparatus of claim 106, wherein a plurality of said frequency agile second modulators is operative for modulating telephony signals from the subscriber in a plurality of frequency subbands in said second band of the subscription network so as to provide selectably variable bandwidth in said second band commensurate with a selected subscriber communication feature.

108. The apparatus of claim 107, wherein said selected subscriber communication feature comprises voice grade telephone service.

109. The apparatus of claim 107, wherein said selected subscriber communication feature comprises ISDN telephone service.

110. The apparatus of claim 107, wherein said selected subscriber communication feature comprises plural voice grade telephone service.

111. The apparatus of claim 107, wherein said selectably variable bandwidth comprises at least one subband provided in said second band of said subscription network.

112. The apparatus of claim 111, wherein said selectably variable bandwidth comprises a plurality of non contiguous subbands.

113. The apparatus of claim 111, further comprising:

a noise monitor for monitoring the noise level in a selected subband in said second band associated with a selected subscriber, and wherein said frequency agile second modulator is operative to reassign signals in said selected subband to another subband at another frequency in response to a determination by said noise monitor that the noise level in said selected subband exceeds a predetermined level.

\* \* \* \* \*